US010056952B2

(12) United States Patent
Ghosh et al.

(10) Patent No.: US 10,056,952 B2
(45) Date of Patent: Aug. 21, 2018

(54) METHOD OF CONTROLLING UPLINK MULTIPLE USER TRANSMISSIONS IN DENSELY DEPLOYED WIRELESS LOCAL AREA NETWORKS

(71) Applicant: INTEL CORPORATION, Santa Clara, CA (US)

(72) Inventors: Chittabrata Ghosh, Fremont, CA (US); Yaron Alpert, Hod Hasharoni (IL)

(73) Assignee: INTEL CORPORATION, Santa Clara, CA (US)

( * ) Notice: Subject to any disclaimer, the term of this patent is extended or adjusted under 35 U.S.C. 154(b) by 252 days.

(21) Appl. No.: 14/978,730

(22) Filed: Dec. 22, 2015

(65) Prior Publication Data

US 2017/0078003 A1    Mar. 16, 2017

Related U.S. Application Data

(60) Provisional application No. 62/216,988, filed on Sep. 10, 2015, provisional application No. 62/218,002, filed on Sep. 14, 2015.

(51) Int. Cl.
*H04L 1/00* (2006.01)
*H04B 7/0452* (2017.01)
*H04W 74/04* (2009.01)

(52) U.S. Cl.
CPC .......... *H04B 7/0452* (2013.01); *H04W 74/04* (2013.01)

(58) Field of Classification Search
CPC ............... H04W 52/02; H04W 52/0203; H04J 2203/0019; H04L 12/18; H04L 12/184; H04L 12/1845; H04L 12/185; H04L 2012/5642; H04L 2012/6416; H04L 29/06455; H04L 29/08693; H04L 29/12292; H04L 47/15; H04L 47/806
USPC ................. 370/329, 311, 312, 392
See application file for complete search history.

(56) References Cited

U.S. PATENT DOCUMENTS

| 2008/0112351 | A1* | 5/2008 | Surineni ........... H04W 74/0816 370/312 |
| 2009/0138603 | A1* | 5/2009 | Surineni ............. H04W 76/023 709/227 |
| 2016/0315681 | A1* | 10/2016 | Moon .................. H04B 7/0621 |
| 2017/0006542 | A1* | 1/2017 | Huang .............. H04W 52/0209 |

* cited by examiner

*Primary Examiner* — Dady Chery
(74) *Attorney, Agent, or Firm* — Jason H. Vick; Sheridan Ross, PC

(57) ABSTRACT

Densely populated wireless local area networks (WLANs) can encounter issues with processing multiple user (MU) uplink (UL) transmissions sent from many stations (STAs) simultaneously. The access points (AP) or master stations in these densely populated WLANs must manage the UL MU transmissions. To accomplish the management of the UL MU transmissions, a system for dynamically setting UL MU parameters is provided that can modify or set one or more parameters that govern how each STA is to transmit data to the AP. The parameters may be sent to one or more of the STAs in one or more transmissions and may direct how the STAs are to transmit data for at least some portion of time.

20 Claims, 13 Drawing Sheets

508 →

| MPDU Duration | Min/Max bits/bytes in MPDU | Min/Max number of MSDUs in MPDU | MPDU Density | MSDU Duration | MSDU Density | Min/Max bits/bytes in MSDU | ••• 513 |

| ACK Policy per STA | TID/AC Priority | Allocation Order | Priority per TID/AC | Priority between TID/AC | TID/AC serving limitations | Number of TIDs per STA to be immediately acknowledged | ••• 513 |

| MCS as Function of TID/AC | Power as a Function of TID/AC | Number of NSS/Antenna Chain used by each STA | ••• 513 |

METHOD OF CONTROLLING UPLINK MULTIPLE USER TRANSMISSIONS IN DENSELY DEPLOYED WIRELESS LOCAL AREA NETWORKS

CROSS REFERENCE TO RELATED APPLICATIONS

This application claims priority to U.S. Provisional Application No. 62/218,002, filed Sep. 14, 2015, entitled "WIRELESS DEVICE, METHOD, AND COMPUTER READABLE MEDIA FOR UPLINK RESOURCE ALLOCATION CONTROL IN HIGH-EFFICIENCY WIRELESS LOCAL AREA NETWORKS," and U.S. Provisional Application No. 62/216,988, filed Sep. 10, 2015, entitled "AGGREGATION MANAGEMENT TECHNIQUES FOR UPLINK MULTI-USER TRANSMISSIONS." Both of the above applications are incorporated herein by reference in their entirety for all that they teach and for all purposes.

TECHNICAL FIELD

Embodiments described herein generally relate to wireless communications between devices in wireless networks. Some embodiments relate to a wireless network communicating using Wireless Local Area Networks (WLAN). Some embodiments relate to wireless networks that operate in accordance with one of the Institute of Electrical and Electronics Engineers (IEEE) 802.11 standards including the IEEE 802.11-WLAN standards. Some embodiments relate to spatial reuse. Some embodiments relate to setting resources or parameters for coordinated uplink (UL) simultaneous transmissions.

BACKGROUND

Users of wireless networks often demand more bandwidth and faster response times. However, the available bandwidth may be limited. Moreover, there are more and more wireless devices operating close to one another and using the same wireless networks. These wireless networks are generally densely constructed with high levels of signal traffic. The wireless devices on the wireless networks can change or set many parameters that determine how the wireless devices interact with one another. In some environments, wireless devices may operate with different communication standards.

In the conventional carrier sense multiple access with collision avoidance (CSMA-CA) protocol, a station (STA) contends for the medium using a contention time window (CW) to operate in a channel. However, in Orthogonal Frequency-Division Multiple Access (OFDMA), an access point (AP), in the network, may have the ability to allocate sub-channels or subcarriers (a portion of the bandwidth in a channel known as a tone) instead of an entire channel. Organizing the allocation can be difficult. Currently, there are few methods of directing the various STAs to organize the allocation of bandwidth based on characteristics of the network.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5E is another data diagram chart illustrating an embodiment of UL MU parameters that may be changed or set by an AP;

FIG. 5F is another data diagram chart illustrating an embodiment of UL MU parameters that may be changed or set by an AP;

FIG. 5G is another data diagram chart illustrating an embodiment of UL MU parameters that may be changed or set by an AP;

DESCRIPTION OF EMBODIMENTS

Figure 1:
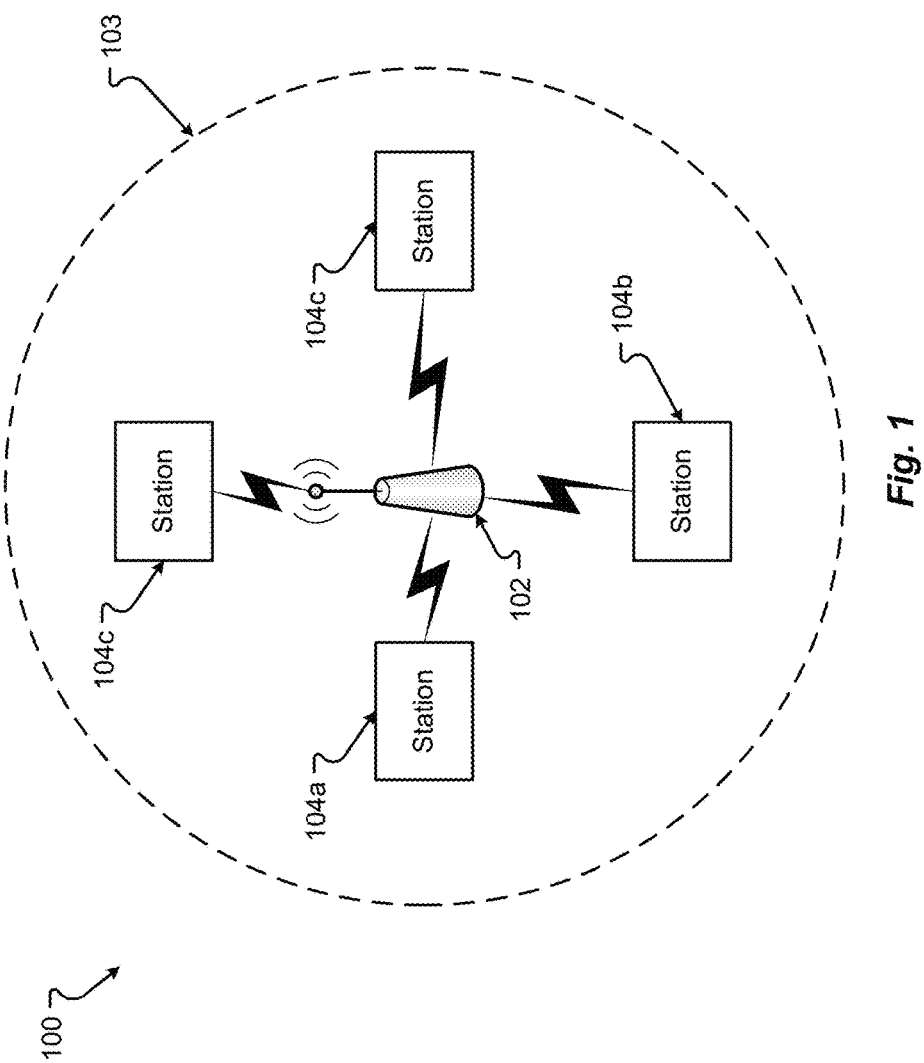
FIG. 1 is a block diagram illustrating an embodiment of a communication environment including one or more access points and one or more stations.

Embodiments herein are generally directed to wireless communications systems. Various embodiments are directed to wireless communications performed according to one or more wireless communications standards. Some embodiments may involve wireless communications performed according to High-Efficiency Wi-Fi standards developed by the IEEE 802.11 High Efficiency WLAN (HEW) Study Group. Various embodiments may involve wireless communications performed in accordance with an IEEE 802.11ax or other standard, whether adopted or proposed. Some embodiments may involve wireless communications performed in accordance with the DensiFi Specification Framework Document (SFD).

Some embodiments may additionally or alternatively involve wireless communications according to one or more other wireless communication standards. Examples of other wireless communications technologies and/or standards that may be used in various embodiments may include—without limitation—other IEEE wireless communication standards, such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, IEEE 802.11 ah, and/or IEEE 802.11ay standards, Wi-Fi Alliance (WFA) wireless communication standards, such as, Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above.

Some embodiments may involve wireless communications performed according to one or more broadband wireless communication standards. For example, various embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Additional examples of broadband wireless communication technologies/standards that may be utilized in some embodiments may include—without limitation—Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

FIG. 1 illustrates an example of an operating environment 100 such as may be representative of various embodiments. The WLAN may comprise a basic service set (BSS) 100 that may include a master station 102 and one or more STAs 104. The master station 102 may be an AP using the IEEE 802.11 protocol(s) to transmit and receive. Hereinafter, the term AP will be used to identify the master station 102 but the embodiments may not be limited to the AP performing the functions described herein as a master station may also perform the functions. The AP 102 may be a base station and may use other communications protocols as well as the IEEE 802.11 protocol. The IEEE 802.11 protocol may be IEEE 802.11ax or later standard. The IEEE 802.11 protocol may include using OFDMA, time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The STAs 104 may include one or more high-efficiency wireless (HEW) (as illustrated in, e.g., the IEEE 802.11ax standard) STAs and/or one or more legacy (as illustrated in, e.g., the IEEE 802.11n/ac standards) STAs. The legacy STAs may operate in accordance with one or more of IEEE 802.11a/b/g/n/ac/ad/af/ah/aj, or another legacy wireless communication standard. The HEW STAs 104 may be wireless transmit and receive devices, for example, a cellular telephone, a smart telephone, a handheld wireless device, wireless glasses, a wireless watch, a wireless personal device, a tablet, or another device that may be transmitting and receiving using a IEEE 802.11 protocol, for example, the IEEE 802.11ax or another wireless protocol. In the operating environment 100, an AP 102 may generally manage access to the wireless medium in the WLAN 103.

Within the environment 100, one or more STAs 104a, 104b, 104c, 104d may associate and/or communicate with the AP 102 to join the WLAN 103. Joining the WLAN 103 may enable STAs 104a-104d to wirelessly communicate with each other via AP 102, with each other directly, with the AP 102, or to another network or resource through the AP 102. In some configurations, to send data to a recipient (e.g., STA 104a), a sending (e.g., STA 104b) may transmit an UL physical layer convergence procedure (PLCP) protocol data unit (PPDU) comprising the data, to AP 102, which may then send the data to the recipient STA 104a, in a downlink (DL) PPDU. The PLCP is the physical layer protocol that is used with 802.11 and other standards.

In some configurations, a frame of data transmitted between the STAs 104 or between a STA 104 and the AP 102 may be configurable. For example, a channel used for communication may be divided into subchannels that may be 20 MHz, 40 MHz, or 80 MHz, 160 MHz, 320 MHz of contiguous bandwidth or an 80+80 MHz (160 MHz) of non-contiguous bandwidth. Further, the bandwidth of a subchannel may be incremented into 1 MHz, 1.25 MHz, 2.03 MHz, 2.5 MHz, 5 MHz and 10 MHz bandwidths, or a combination thereof, or another bandwidth division that is less or equal to the available bandwidth may also be used. The bandwidth of the subchannels may be based on a number of active subcarriers. The bandwidth of the subchannels can be multiples of 26 (e.g., 26, 52, 104, etc.) active subcarriers or tones that are spaced by 20 MHz. In some configurations, the bandwidth of the subchannels is 256 tones spaced by 20 MHz. In other configurations, the subchannels are a multiple of 26 tones or a multiple of 20 MHz. A 20 MHz subchannel may also comprise 256 tones for use with a 256 point Fast Fourier Transform (FFT).

When managing access to the wireless medium in the WLAN 103, the AP 102 may schedule medium access, for the sending STA 104b, during a UL time interval, during which the AP 102 may refrain from transmitting over the wireless medium. The UL time interval may comprise a portion of a transmit opportunity (TXOP) owned by AP 102.

At a given point in time, multiple STAs (e.g., 104b and 104c), in the WLAN 103, may wish to send data. In some configurations, rather than scheduling medium access for STAs 104b and 104c in different respective UL time intervals, the AP 102 may schedule medium access for STAs 104b and 104c to support UL MU transmission techniques, according to which multiple STAs 104b and 104c may transmit UL MU PPDUs to the AP 102 simultaneously during a given UL time interval. For example, by using UL MU OFDMA techniques during a given UL time interval, multiple STAs 104b and 104c may transmit UL MU PPDUs to the AP 102 via different respective OFDMA resource units (RUs) allocated by the AP 102. In another example, by using UL MU multiple-input multiple-output (MU-MIMO) techniques during a given UL time interval, multiple STAs 104b and 104c may transmit UL MU PPDUs to the AP 102 via different respective spatial streams allocated by the AP 102.

To manage access, the AP 102 may transmit a HEW master-sync transmission, which may be a trigger frame (TF) or a control and schedule transmission, at the beginning of the control period. The AP 102 may transmit a time duration of the TXOP and sub-channel information. During the HEW control period, HEW STAs 104 may communicate with the AP 102 in accordance with a non-contention based multiple access technique, such as OFDMA or MU-MIMO. This HEW technique is unlike conventional WLAN communications in which devices communicate in accordance with a contention-based communication technique, rather than a multiple access technique. During the HEW control period, the AP 102 may communicate with stations 104 using one or more control frames, and the STAs 104 may operate on a sub-channel smaller than the operating range of the AP 102. Also, during the control period, legacy stations may refrain from communicating.

During the HEW master-sync transmission, the STAs 104 may contend for the wireless medium with the legacy devices 106 being excluded from contending for the wireless medium during the HEW master-sync transmission. The TF used during this HEW master-sync transmission may indicate an UL-MU-MIMO and/or UL OFDMA control period. The multiple-access technique used during the control period may be a scheduled OFDMA technique, or alternatively, may be a TDMA technique, a frequency division multiple access (FDMA) technique, or a SDMA technique.

The AP 102 may also communicate with legacy stations and/or HEW stations 104 in accordance with legacy IEEE 802.11 communication techniques. In some configurations, the AP 102 may also be configurable to communicate with HEW stations 104 outside the HEW control period in accordance with legacy IEEE 802.11 communication techniques, although this is not a requirement.

Figure 2:
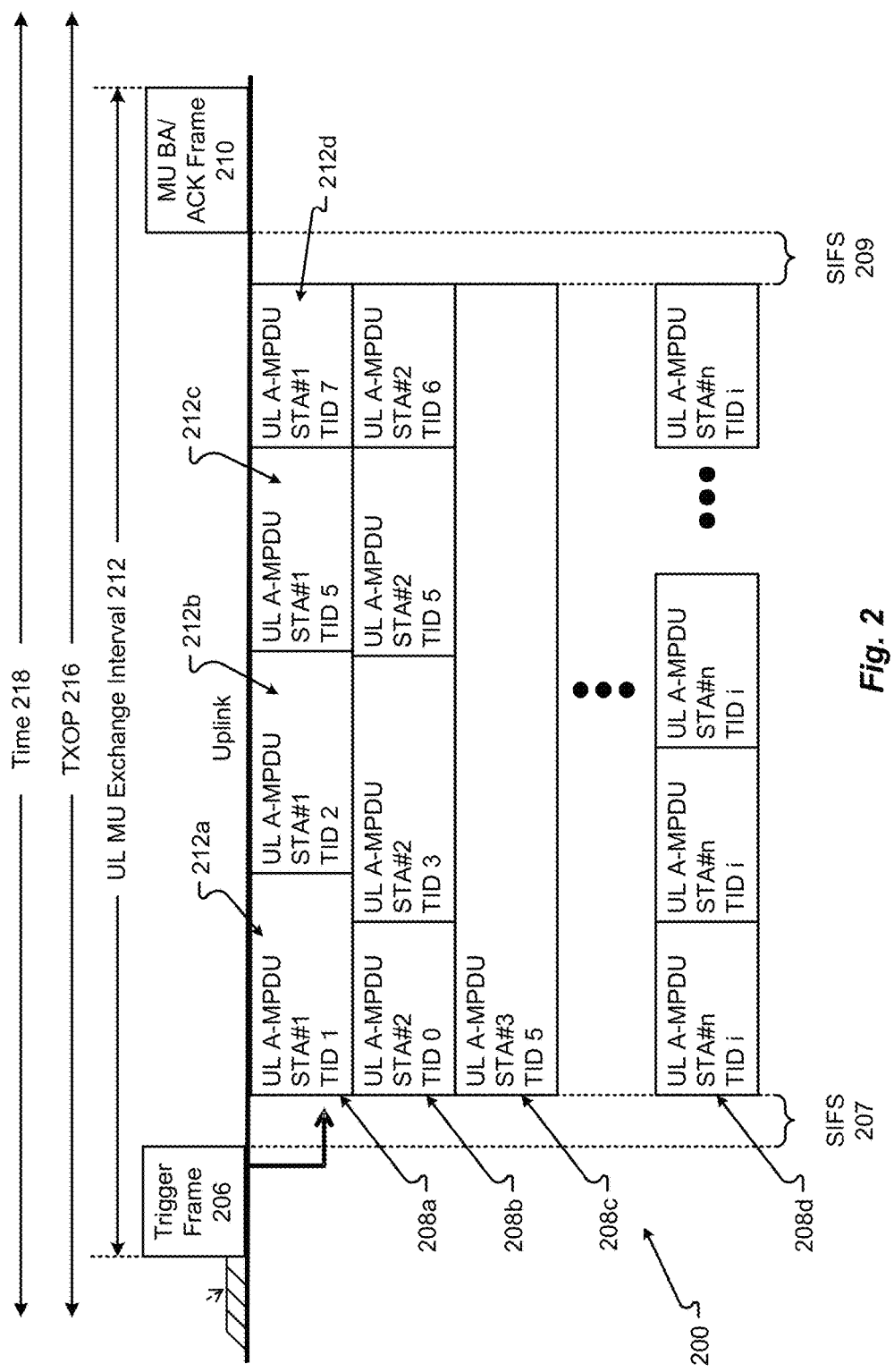
FIG. 2 is a signal diagram illustrating an embodiment of communications between one or more STAs and one or more APs.

FIG. 2 illustrates an example of a communications flow 200 that may be representative of communications between an AP 102 and a STA 104. Generally, the communications flow 200 occurs during an UL MU exchange interval 212 within the TXOP 216 owned by the AP 102. The TXOP 216 may exist within some period of discrete time 218. The exchange interval 212 generally has three phases, the sending of a trigger frame 206, which is followed by transmission of one or more PPDUs 208, which is followed by an acknowledgement 210. These three phases may be separated by a short inter-frame space (SIFS) 207, 209.

In the communications flow 200, the AP 102 can transmit a TF 206 to notify the STAs 104a-104d that the AP 102 is scheduling resources to use in concurrently transmitting respective UL MU PPDUs 208a, 208b, 208c, and 208d. In accordance with the IEEE 802.11ax specification framework document (SFD), a TF 206 synchronizes the STAs 104 before UL traffic transmission. The designated STAs 104, with assigned resources (sub-channels) indicated in the TF 206, transmit UL data after SIFS time 207 of the TF 206 transmission. These allocated resources may comprise different respective OFDMA RUs via which STAs 104a-104d are to transmit UL MU PPDUs 208a-208d. In other configurations, these allocated resources may comprise different respective spatial streams via which STAs 104a-104d are to transmit UL MU PPDUs 208a-208d.

UL MU PPDUs 208a-208d may contain data for the MAC layer. The MAC layer in the Open Systems Interconnection (OSI) model or other communication model can communicate service data units (SDUs) as MAC SDUs (MSDUs). The MAC layer formats or wraps one or more MSDUs, with a MAC header and/or other protocol data, to create a MAC protocol data unit (MPDU). One or more MPDUs may then be aggregated to create an aggregate MPDU (A-MPDU). Each PPDU can include one or more A-MPDUs, for example, A-MPDU 212a, 212b, 212c, and 212d, in PPDU 208a.

To acknowledge receipt of MPDUs, contained within the A-MPDUs 212, the AP 102 may transmit a multi-user BA (MU-BA) frame 210. However, it may be possible to provide separate ACK packets for each of the MPDUs instead of the MU-BA frame 210.

Each A-MPDU 212 may contain one or more respective MPDUs, which may each be associated with one of multiple different traffic identifiers (TIDs). The length of the MU-BA frame 210—and thus the amount of time required for transmission of the MU-BA frame 210 (the "transmission duration" of MU-BA frame 210)—may depend on how many TIDs are represented within each respective A-MPDU 212 comprised within UL MU PPDUs 208a-208d. The more TIDs that are represented, the greater the transmission duration of the MU-BA frame 210. The transmission duration of MU-BA frame 210 may also depend on the mix of ACK indications and BA indications to acknowledge the various received MPDUs, which may depend on particular aspects of the formats of the A-MPDUs 212. However, AP 102 may be unaware of how many TIDs are represented in the A-MPDUs 212 or of knowing the relevant details regarding the formats of the A-MPDUs 212 at the time that the AP 102 transmits TF 206.

In various embodiments, TF 206 and UL MU PPDUs 208a-208d may be spaced apart in the time dimension by a SIFS 207. The UL MU PPDUs 208-1 to 208-4 and MU-BA frame 210 may also be spaced apart in the time dimension by a SIFS 209. FIG. 2 depicts a UL MU exchange interval 212 that comprises the overall time interval during which TF 206, UL MU PPDUs 208a-208d, and MU-BA frame 210 are exchanged among AP 102 and STAs 104a-104d. If these messages are to be successfully exchanged, other devices in the network may need to refrain from transmitting during the UL MU exchange interval 212.

A MAC header for the TF 206 may comprise a Duration Field that the AP 102 may use to specify an amount of time during which such devices should refrain from transmitting following the time of transmission of TF 206. To instruct such devices to refrain from transmitting during UL MU exchange interval 212, the AP 102 may need to set the Duration Field to specify an amount of time at least as long as the UL MU exchange interval 212. The AP 102 may estimate the UL MU exchange interval 212, and possibly one or more additional time intervals successive to UL MU exchange interval 212, during which devices other than itself and STAs 104a-104d should refrain from transmitting—and may use the estimate(s) to determine the appropriate value of the Duration Field. Unfortunately, the estimation of the time for the Duration Field may be problematic without knowing the number of TIDs in each A-MPDU 212.

Figure 3:
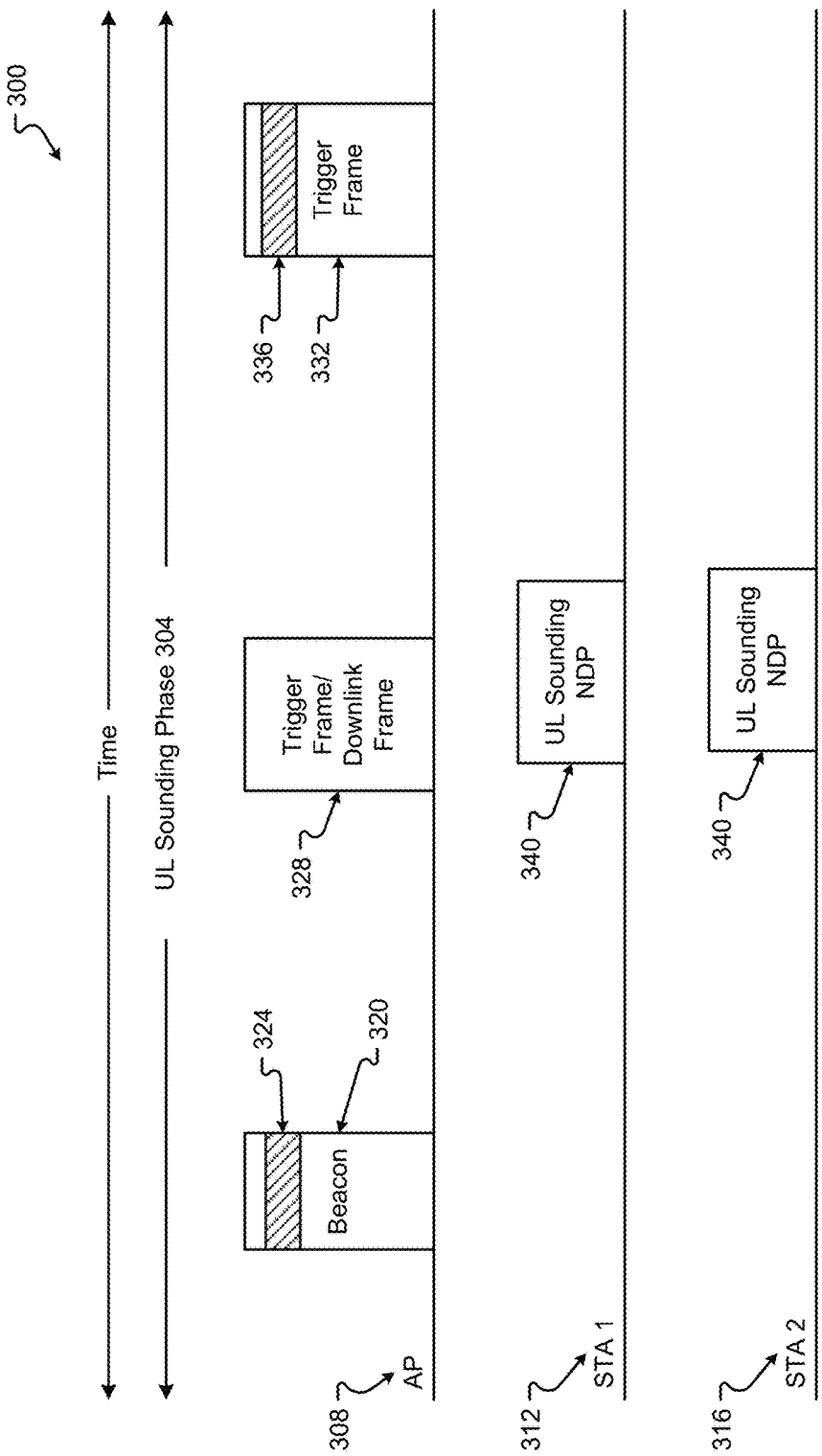
FIG. 3 is another signal diagram illustrating an embodiment of communications between one or more STAs and one or more APs.

Another signal environment 300 showing transmissions during an UL Sounding Phase 304 is shown in FIG. 3. A UL Sounding Phase 304 may occur before transmission of the UL data as shown in FIG. 2. The AP 102 sends a series of transmissions 308 that can include one or more beacons 320, a trigger frame/downlink frame 328, and/or a trigger frame 332. These transmissions 320-332 can assist the STAs 104 in associating with the WLAN 103, receiving DL data, and/or sending UL data. Any or all of the transmissions 320-332 can include some or all of the information or parameters that may control the UL MU transmissions of the various STAs 104.

The STAs 104 may also have transmissions during the UL Sounding Phase 304. Transmissions, e.g., transmissions 312, 316 from the STAs 104, may include UL Sounding null data packets (NDP) 340. It may be possible for the STAs 104 to respond or negotiate parameters for the UL MU transmissions by incorporating responses to the AP 102 in the UL Sounding NDPs 340. It is also possible that the UL MU parameters sent by the AP 102 and responses by the STAs 104 may be included in other transmissions not shown in FIG. 3. As explained hereinafter, the UL MU transmission parameters can include numerous long-term or short-term settings or limits to control the UL MU transmissions, for example, the number of TIDs allowed in each A-MPDU 212.

Figure 4A:
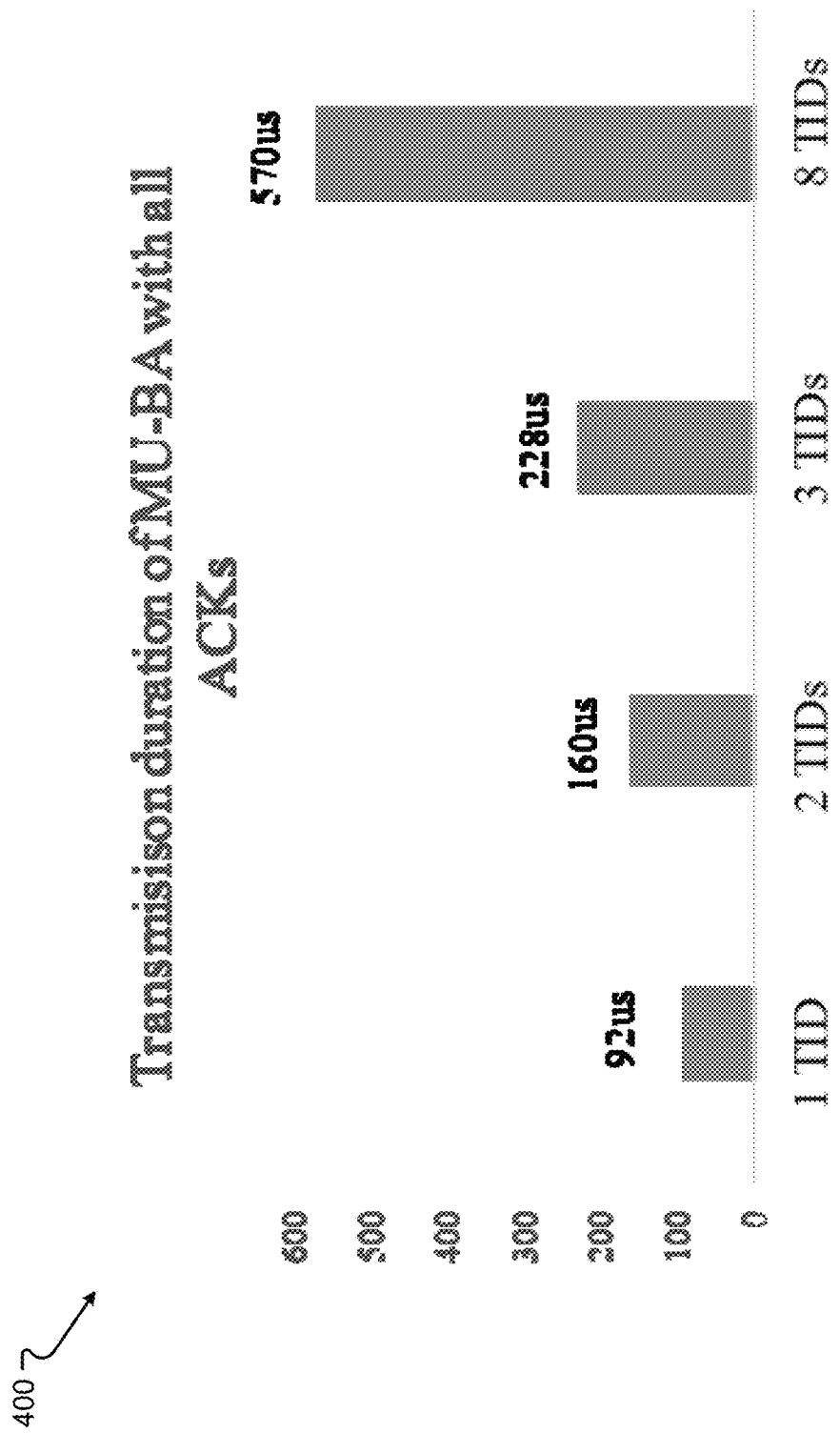
FIG. 4A is a bar chart illustrating an embodiment of different amounts of time required to send acknowledgment (ACK) packets based on the number of Traffic Identifiers (TIDs) in a transmission.
Figure 4B:
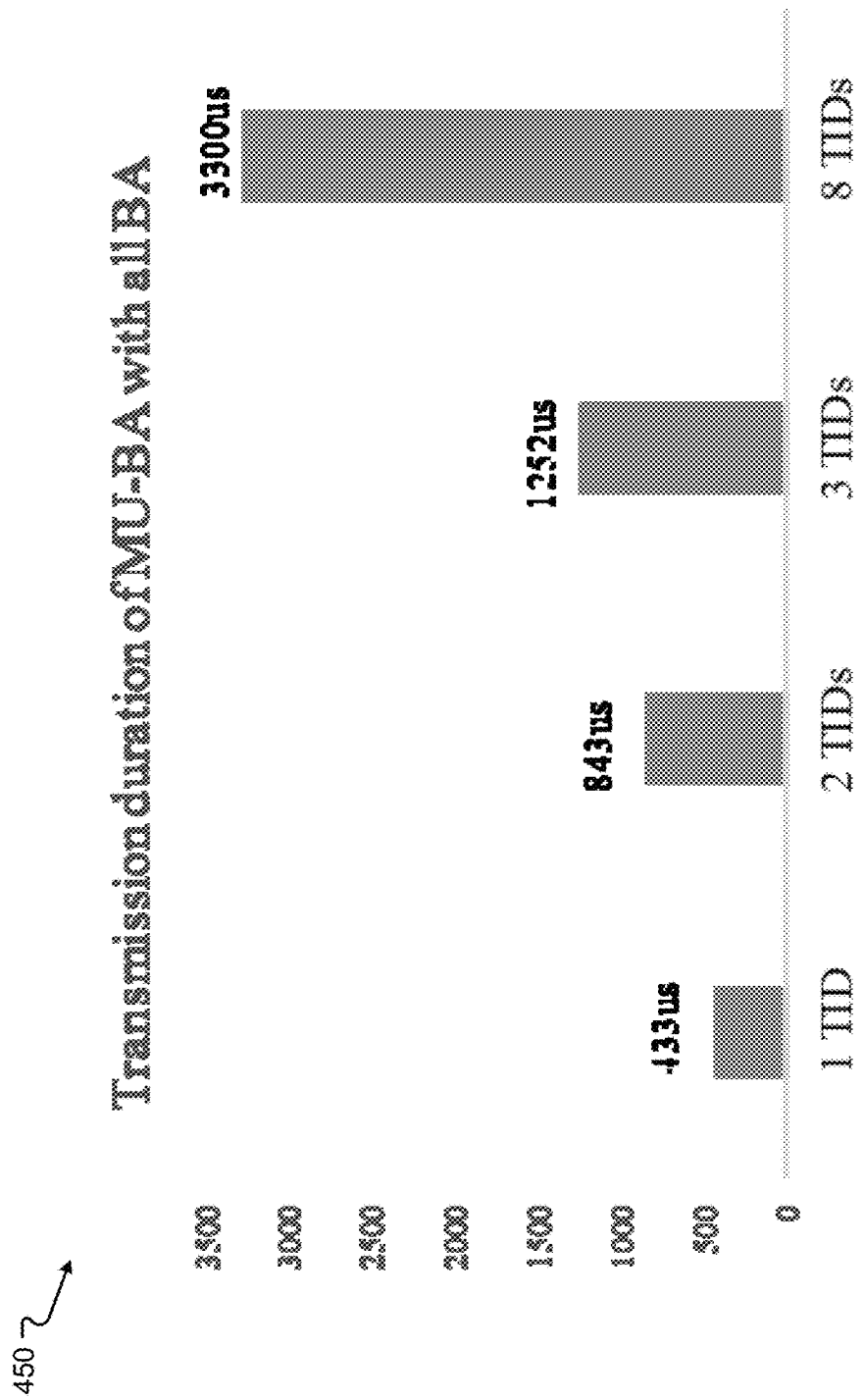
FIG. 4B is another bar chart illustrating an embodiment of different amounts of time required to send Block Acknowledgment (BA) packets based on the number of Traffic Identifiers (TIDs) in a transmission.

FIGS. 4A and 4B illustrate example transmission duration charts 400 and 450 for acknowledgement of received MPDUs, as described in conjunction with FIG. 2. As reflected in FIG. 4, the required transmission duration for a MU-BA frame 210 may vary greatly depending on the number of TIDs present in the A-MPDUs 212 and on whether ACK indications or BA indications are used. For example, as shown in transmission duration chart 400—which depicts durations associated with transmission of an MU-BA frame comprising only ACK indications—the required transmission for an MU-BA 210, with all ACKs, can be as little as 0.092 ms (in the case where only one TID is present in the A-MPDU 212). In contrast, as shown in transmission duration chart 450—which depicts durations associated with transmission of an MU-BA frame comprising only BA indications—the required transmission time for a MU-BA 210, with all BAs, can be as large as 4.400 ms (in the case where 8 TIDs are present in the A-MPDU).

Thus, if there is no restriction imposed on the number of TIDs that are represented in the A-MPDUs 212, AP 102 may not be able to indicate an appropriate value of the Duration Field in the MAC header of the TF 206. An inappropriate value of the Duration Field may lead to erroneous network allocation vector (NAV) settings at devices that need to refrain from transmitting during UL MU exchange interval 212.

Disclosed hereinafter are management techniques for UL MU transmissions. According to various such techniques, various parameters, such as the number of TIDs that may be present in the A-MPDUs transmitted by a given STA 104, may be set or changed. For example, the AP 102 can establish a per-STA TID limit (PSTL), which may apply to all STAs 104 involved in the UL MU exchange.

The UL MU parameters may be transmitted in one or more data structures that can be incorporated into one or more transmissions between the AP 102 and the STAs 104, as described in conjunction with FIG. 3. Some portion of the UL MU parameters may be transmitted in one transmission while another or other portion(s) of the UL MU parameters may be transmitted in another transmission. At least some of the possible UL MU parameters set and sent by the AP 102 to the STAs 104 may be as shown in FIGS. 5A-5G. The organization and arrangement of the UL MU parameters shown in FIGS. 5A-5G is only exemplary, as different arrangements or organizations are possible.

As illustrated above with FIGS. 1-4, to optimize the STA 104 transmissions, the AP 102 can indicate the appropriate metrics for transmission from the STA 104. For example, the transmit power or preferred MCS by the STA 104 or the tone selection out of 9 sub-channels in a 20 MHz channel can be indicated by the AP 102. In configurations presented herein, the AP 102 can dynamically control and restrict (short and/or long term) a set of parameters influencing the specific STA 104 UL MU transmission format. The AP 102 may restrict or modify the UL MU transmissions by dynamically controlling (over the short term and/or the long term) a set of UL MU transmission parameters. The control by the AP 102 may be indicated or made in trigger frames 206, 320, resource allocation information elements, or other transmission(s), which may be pre-negotiated during association, traffic stream (TS) establishment, or may be with a link condition change between an AP 102 and a STA 104.

Some of the UL MU parameters can restrict the length of a DL MU-BA with respect to the received UL MU transmissions, which may provide fairness to STAs 104 with respect to QoS, number of TIDs aggregated in A-MPDUs within an assigned duration, or in limiting the number of antennas used per STA 104 for UL transmissions. Further, the AP 102 may indicate semi-static parameters for UL transmissions in beacons and other management frames, or even during TS establishment. For finer control on these parameters, the AP 102 can indicate short term restrictions in parameters based on the UL sounding phase 304 preceding the TF 206 and/or in a resource allocation information element transmission for UL MU data transmissions. The dynamic and/or static UL MU parameters will be described hereinafter.

Figure 5A:
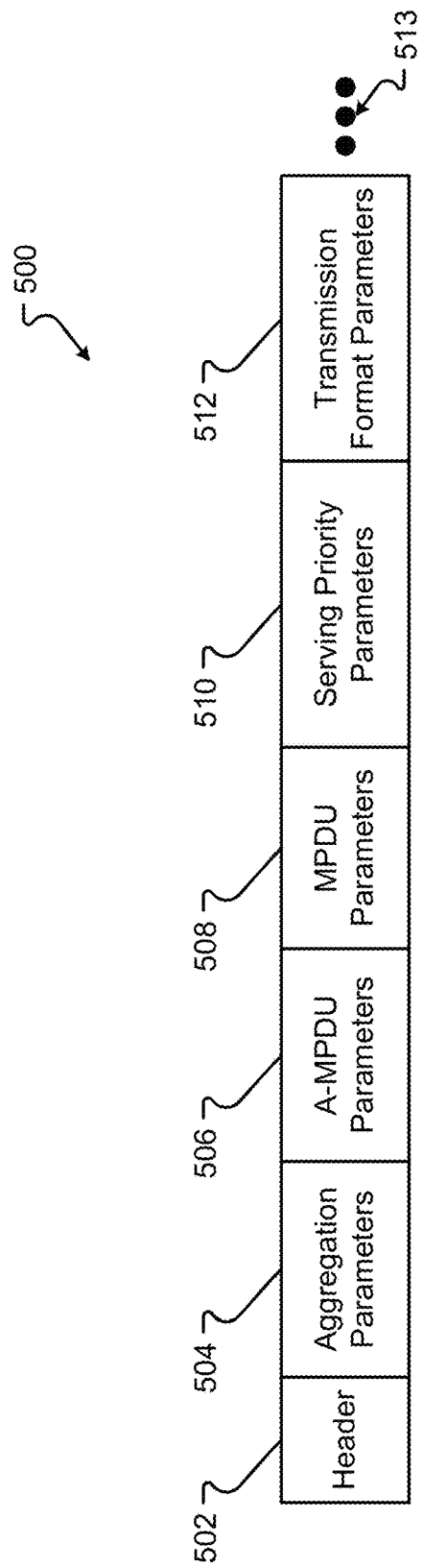
FIG. 5A is a data diagram chart illustrating an embodiment of UL multiple user (MU) parameters that may be changed or set by an AP.

An embodiment of a data structure 500 for transmitting uplink multi-user parameters is as shown in FIG. 5A. The data structure 500 is an organization format for the UL MU parameters. This organizational structure may not be the format used to transmit the data but is provided to explain at least some of the parameters that may be provided to the one or more STAs 104. The data 500 may be organized generally into a header portion 502, an aggregation portion 504, an A-MPDU portion 506, an MPDU portion 508, a serving priority portion 510, and/or a transmission format per service portion 512. These several portions are described hereinafter in the figures that follow. Throughout FIGS. 5A-5G, there may be more or fewer fields or portions within the UL MU parameters, as represented by ellipses 513.

Figure 5B:
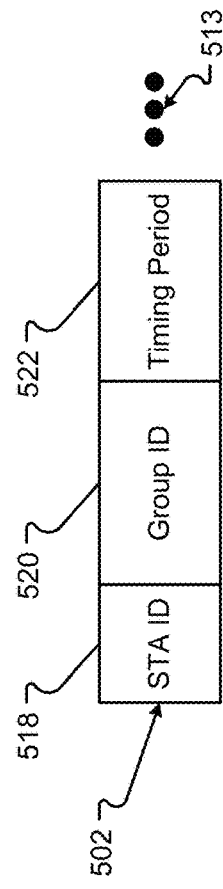
FIG. 5B is another data diagram chart illustrating an embodiment of UL MU parameters that may be changed or set by an AP.

The header portion 502 of the data structure 500 maybe as shown in FIG. 5B. The header portion 502 may include one or more items of information to generally arrange, organize, and/or manage the parameters that follow in the other portions 504-512 of data structure 500. Thus, some or all of the information within the header portion 502 may accompany a transmission of a portion or an entirety of the other information in portions 504-512. Generally, the UL MU parameters may be for one or more STAs 104, one or more groups of STAs 104, a single STA 104, for the current UL MU transmission, for a certain pre-defined period of time, until further notice, etc. To manage these limitations, the header portion 502 can include data directed to these parameters. In at least some configurations, the header portion 502 can, for instance, include, but is not limited to, a STA identifier (ID) 518, a STA group ID 520, and one or more parameters associated with a time period or duration of the parameter changes 522.

The STA ID (SID) 518 can be any type of identifier, such as a global unique identifier (GUID) or other types of IDs that identify the STA 104 uniquely among other STAs 104, either within the WLAN 103 or the network, generally. The group ID (GID) 520 can be any type of identifier, such as a GUID, which identifies two or more STAs 104 associated as a group within the WLAN 103, or network. The GID 520 may be associated with two or more of the STAs and thus when provided, the UL MU parameters may be associated with all STAs 104 within the group identified by the GID 520.

The STAs 104 receiving the UL MU parameters may apply those parameters based on receiving their SID 518 or GID 520. If the UL MU parameters are to be applied globally, the UL MU parameters may be provided as global parameters possibly indicated by another separate identifier or bit, or may be applied globally due to the absence of the SID 518 and/or GID 520 or any other type of identifier within the UL MU parameter packet. Further, how the STAs 104 apply the UL MU parameters may be based on in which transmission the STA 104 received the UL MU parameters. For example, if the UL MU parameters are received in the beacon 320, the UL MU parameters may be considered to be globally applied to all STAs 104. In contrast, if the UL MU parameters are received in the trigger frame 332, the UL MU parameters may be considered to apply to only those STAs 104 associated with sending the PPDU frames in the UL MU Exchange Interval 212 associated with that trigger frame 332.

The time period portion 522 can include information about how long the UL MU parameters are to be applied. The time period portion 522, for instance, can include an indicator that the current parameters are only for the current UL MU transmission period. The time period portion 522 may also designate a predefined time period based either on a start and stop time, a time period indicated by a discrete time duration (e.g., next hour, next day, etc.), or possibly on a number of PPDU frames 208 or other set of frames transmitted to the AP 102. The time period portion 522 may also provide an indicator that the UL MU parameters are to be applied until further notice. The notice to dismiss the UL MU parameters may then include another bit or bits to indicate when the UL MU parameters are to be changed or dismissed. Further, the time period for applying the UL MU parameters may be determined by the STA 104 based on in which transmission the UL MU parameters are received. For example, if the UL MU parameters are received in the beacon 320, the UL MU parameters are considered to be long-term or until further notice settings. In contrast, if the UL MU parameters are received in the trigger frame 332, the UL MU parameters may be considered to be short term and only applied to the PPDU frames sent in response to that trigger frame 332.

Figure 5C:
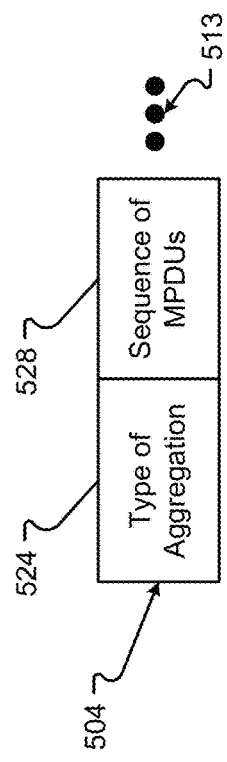
FIG. 5C is another data diagram chart illustrating an embodiment of UL MU parameters that may be changed or set by an AP.

The aggregation portion 504 of the data structure 500 may be as shown in FIG. 5C. The aggregation portion 504 may include one or more bits indicating the type of aggregation 524 to be used in the UL MU transmission(s) and one or more bits for defining the sequence of MPDUs 528 in the UL MU transmission(s).

The type of aggregation portion 524 can include one or more bits to indicate whether there is to be aggregation of the MSDU packets in the MPDU packet or whether and/or how MPDU packets will be aggregated into A-MPDUs. The type of aggregation could be no aggregation (e.g., no multiple MPDUs in an A-MPDU), single aggregation (e.g., one MPDU in each A-MPDU and/or one MSDU in each MPDU), or double aggregation (e.g., two MPDUs in each A-MPDU and/or two MSDUs in each MPDU). There may be one or more bits to indicate which of these types of aggregation may be used.

The sequence of MPDUs portion 528 may include one or more bits to indicate whether the MPDUs and/or MSDUs are to be arranged in a mixed mode or an ordered mode. For example, the mixed mode may have no set arrangement for the sequence of MSDUs or MPDUs for each TID within the MPDU or A-MPDU. The ordered MPDU mode may require that the MSDUs or MPDUs aggregated in the MPDU or A-MPDU are arranged in a logical or set order per TID (e.g., TID1, TID2, etc.).

Figure 5D:
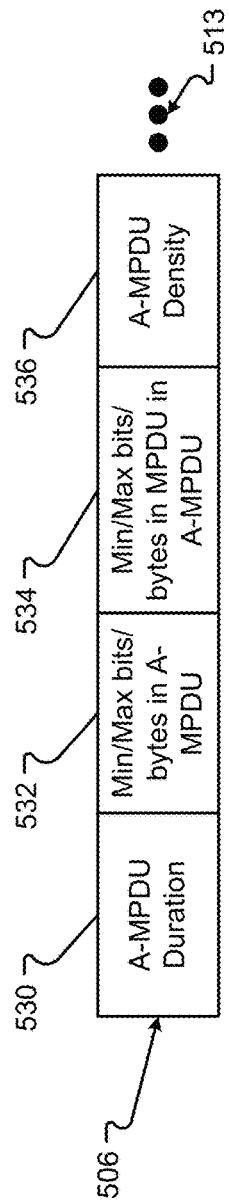
FIG. 5D is another data diagram chart illustrating an embodiment of UL MU parameters that may be changed or set by an AP.

The A-MPDU portion 506 may be as shown in FIG. 5D. The A-MPDU portion 506 may include information for the A-MPDU duration 530, the minimum number of bits or bytes in the A-MPDU 532, the maximum number of bits or bytes in an A-MPDU, and/or the A-MPDU density 536.

The A-MPDU duration 530 may indicate either a time period for transmission of the A-MPDU or a discrete number of bits or frames to be included in the A-MPDU. The duration field 530 can indicate the start and stop bit or time of the A-MPDU or some other information that indicates the amount or duration of the A-MPDU.

The minimum and/or maximum number of bits or bytes in each A-MPDU may be as indicated in portion 532. This minimum or maximum number of bits or bytes 532 may be a total number of bits or bytes for the A-MPDU or may have a start and stop bit indicated for each A-MPDU.

The minimum or maximum number of MPDU packets in an A-MPDU may be as provided in section 534. This minimum or maximum number of MPDU packets may be a discrete number, such as two, three, four, etc., or may indicate some number and/or arranged of portions within the A-MPDU to indicate the number of MPDUs to place within the A-MPDU.

The A-MPDU density field 536 may indicate the number of MPDUs to be placed in the A-MPDU field or provide the amount of gap or padding within the A-MPDU packet to indicate the number of MPDU packets within the aggregated MPDU and how those packets are to be placed within the A-MPDU. Thus, the A-MPDU density field 536 indicates how closely spaced the MPDU packets are to be within the A-MPDU.

The MPDU format information may be provided in portion 508, as shown in FIG. 5E. The MPDU information 508 may include the MPDU duration 538, the number of minimum or maximum bits or bytes in an MPDU 540, the minimum or maximum number of MSDUs in each MPDU 542, the MSDU duration 544, the MPDU density 546, and/or the MSDU density 548.

Similar to portion 530, the MPDU duration 538 provides one or more bits or bytes that determine the length of each MPDU packet. This MPDU duration 538 may be a discrete number of bits or bytes or may indicate a start and stop time and/or bit for each MPDU packet.

The minimum and maximum number of bits or bytes in an MPDU 540 may determine the size of the MPDU packets, which may be set as a discrete number of bits or bytes or may be set as a pair of start and stop bits. The minimum or maximum number of MSDUs in an MPDU 542 can indicate the number of MSDU packets to be provided in each MPDU. This number of MSDU packets to be provided in each MPDU 542 may be a discrete number of packets or may provide pair(s) of first and last bits for each MSDU within the MPDU.

The MSDU duration portion 544 may indicate the size of each MSDU packet within the MPDU packets. This size of or duration for the MSDU packet 544 may be the discrete number of bits or bytes for each MSDU packet or may include the start and stop bits for each MSDU packet based on timing, which can include a first and last a bit for each MSDU packet.

The MPDU density 546 and the MSDU density 548 can include the amount of padding or gap between each packet, whether the packet(s) are MPDU packets within an A-MPDU packet or MSDU packets within the MPDU. The density information 546, 548 allows the STA 104 to determine how many packets are included in each A-MPDU or in each MPDU within the packet frame.

A serving priority portion 510 may be as shown in FIG. 5F. The serving priority or serving limits 510 can have one or more fields for determining how to arrange or provide access to multiple STAs 104. The serving priority and/or limits 510 can include a field for an ACK policy per STA 549, a TID or access category (AC) priority 550, an allocation order 552, a priority per TID/AC 554, a priority between TIDs and/or ACs 556, a serving limitations for each TID and/or AC 558, and a number of TIDs per STA that are to be immediately acknowledged 559.

The ACK policy per STA 549 provides how the packets within the PPDUs are to be acknowledged. For example, are all packets to be immediately acknowledged? In other words, the packets are to be acknowledged in an ACK or BA immediately following receipt of the packets or the acknowledgement will occur at some time later. Further, the ACK policy may indicate whether ACKs or BAs will be used for the acknowledgements. The ACK policy per STA 549 may also provide an indication of whether the ACK policy applies to the particular STA, to a group of STAs, or globally.

The TID/AC priority 550 can be an indication of which traffic streams identified by a TID or which AC has priority in either the current transmission or in future transmissions. This access priority 550 may be a listing of the ACs or TIDs to be given priority, such as a sequential ordering of the TIDS or ACs, or may be indicated by information provided to each STA regarding their transmissions based on previous TIDs or ACs.

The allocation order 552 may provide the amount of bandwidth or packets provided to each TID or AC or may provide how many TIDs or ACs may be included in each MSDU, MPDU, and/or A-MPDU. This allocation order 552 can provide or provision the available bandwidth per STA to a number of TIDs or ACs.

In various configurations, the allocation order 552 provides a per-STA TID limit (PSTL). A given PSTL may apply to a specific STA 104. PSTLs may be negotiated between an AP 102 and the STAs 104 involved in a UL MU exchange 212. PSTLs may also be selected unilaterally by the AP 102. Use of PSTLs to restrict the numbers of represented TIDs may reduce the aforementioned variance in the potential transmission durations required for the MU-BA frames 210. PSTLs may be dynamic in nature, and thus PSTLs may be indicated by the AP 102 in each trigger frame 206 that the AP 102 sends to trigger each UL frame transmission. In some configurations, PSTLs may vary from UL frame exchange 212 to UL frame exchange 212 and/or with respect to the MAC duration value. For example, higher PSTLs may be selected with trigger frames 206 that assign resources to a larger number of STAs 104. In another example, higher PSTLs may be selected for lengthier TXOPs than are selected for shorter TXOPs.

The priority per TID/AC 554 and between TIDs/ACs 556 can provide a listing of each TID or AC and the priority assigned to each TID or AC or provides some kind of comparison between the TIDs and/or ACs as to which are to receive a higher priority. The TID/AC serving limitation 558 can determine the number of bytes, bits, or duration of the uplink transmission to provision to each TID and/or AC sent by the STA 104.

The number of TIDs per STA that are to be immediately acknowledged 559 may further define acknowledgement policy first delineated in the ACK policy field 549. The number of TIDs per STA that are to be immediately acknowledged 559 may provide a number of TIDs for each STA that can or will be immediately acknowledged. For example, how many TIDs are to be acknowledged in an ACK or BA immediately following receipt of the packets associated with the TIDs. Some TIDs may be sent that are acknowledged at some time later. The number of TIDs per STA that are to be immediately acknowledged 559 may also provide an indication of whether the TIDs limitation applies to the particular STA, to a group of STAs, or globally.

The transmission format per service portion 516 may be as shown in FIG. 5G. This transmission format per service portion 516 may include the modulation coding scheme (MCS), as a function of the TIDs or ACs included in the transmission, in portion 560, may include a power as of function of TIDs/ACs, in portion 562, and may indicate the number of spatial streams (NSS) or the antenna chain to be used by the STA 104, in portion 564. Each of these transmission formats per service portion 516 parameters can be an indication for how transmissions are to be done by the different STAs 104.

Figure 6:
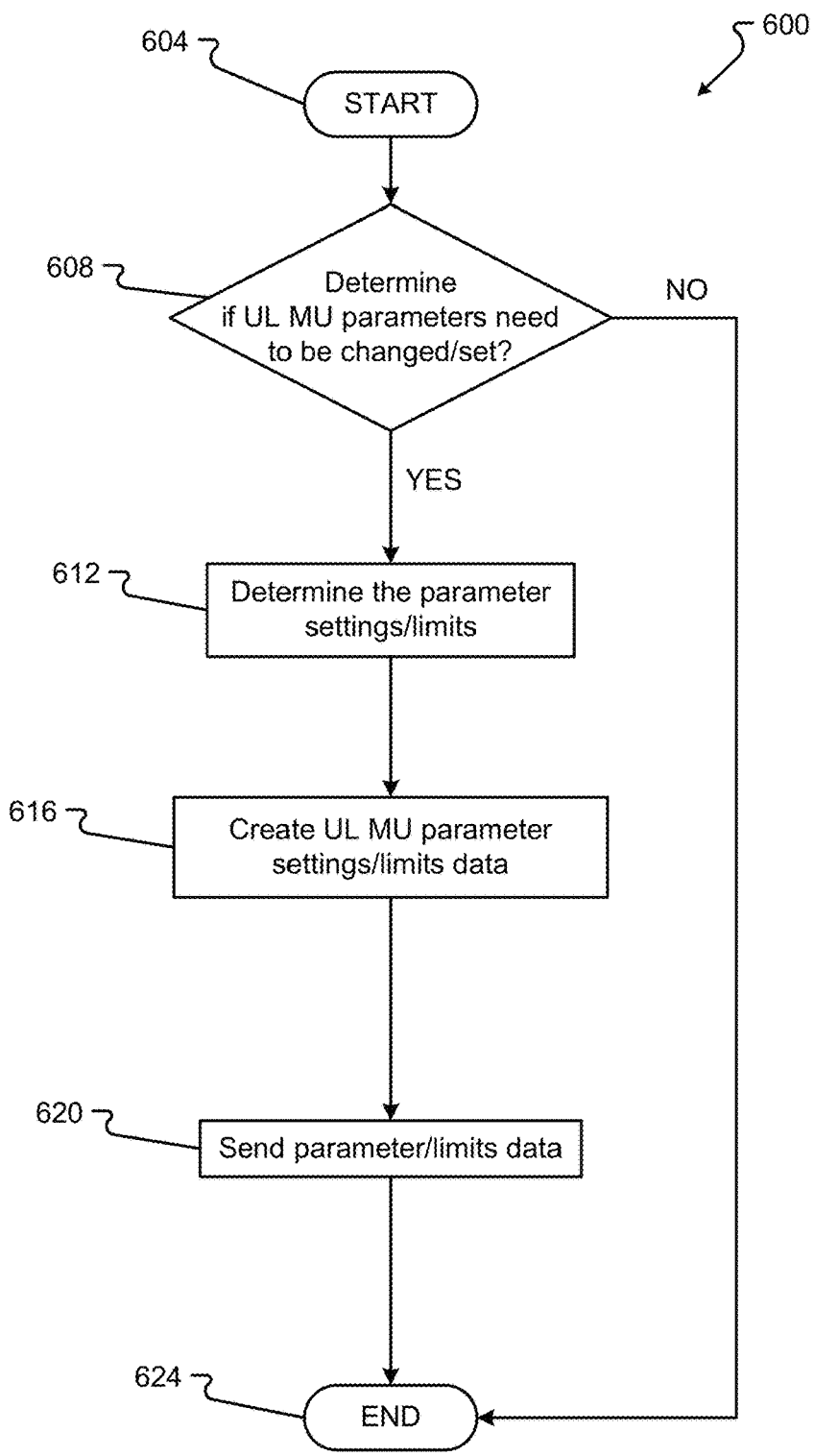
FIG. 6 is a flowchart illustrating an embodiment of a method for establishing UL MU parameters.

An embodiment of a method 600 for creating and sending UL MU parameters is as shown in FIG. 6. Generally, the method 600 starts with a start operation 604 and ends with an end operation 624. The method 600 can include more or fewer steps or can arrange the order of the steps differently than those shown in FIG. 6. The method 600 can be executed as a set of computer-executable instructions, executed by a computer system or processing component, and be encoded or stored on a storage medium. Further, the method 600 can be executed by a gate or other hardware device or component in an Application Specific Integrated Circuit (ASIC), a Field Programmable Gate Array (FPGA), or other type of hardware device. Hereinafter, the method 600 shall be explained with reference to the systems, components, modules, software, data structures, etc. described herein.

The AP 102 may associate one or more STAs 104 with the WLAN 103. Then, the AP 102 may receive UL data and/or obtain or retrieve other data from and/or about one or more STAs 104 for determining whether to change or set the UL MU parameters, in step 608. The data used by the AP 102 to determine whether to change or set the UL MU parameters can include one or more of, but is not limited to: the maximum TXOP 216 duration, the maximum number of STAs 104 assigned resources for UL frame transmissions, the type of service each STA 104 requested, the STA resource data as is reported to the AP by the STA 104, and/or the number of ACs or TIDs allowed in traffic streams for UL transmissions. This data and/or other data may then be analyzed by the AP 102 to determine whether to change or set one or more of the UL MU parameters.

The AP 102 determines if the UL MU parameters need to be changed or set, in step 608. By analyzing the received or determined data described above, the AP 102 can determine if changes need to be made to provide proper Quality of Service (QoS) to the one or more STAs 104 or to deal with the density of the WLAN 103. If the AP 102 determines that parameters need to be changed or set, the method 600 proceeds YES to step 612. However, if the AP 102 determines that no changes need to be made, the method 600 proceeds NO to end step 624.

In step 612, the AP 102 can determine which parameters or the limits to change or set. The parameters or limits may the same or similar to the UL MU parameters described in conjunction with FIGS. 5A through 5G. Determining how to change the UL MU parameters can be based on several criteria, for example: what is the length of the maximum TXOP 216 duration; what are the maximum number of STAs 104 assigned resources for UL frame transmissions; what type or types of service are requested by each STA 104; what is the STA resource status (which may be reported to the AP 102 by the STA 104); what are the number of ACs allowed in traffic streams for UL transmissions; and others. These determinations may have predetermined limits or benchmarks that indicate a change in the UL MU parameters must be made. Further, the AP 102 can review any combination of these determinations to decide how to change the UL MU parameters.

Once the determined parameters or limits are identified or established, the AP 102 may create a UL MU parameter limits data packet or packets, in step 616. The AP 102 can change any of the data described in FIGS. 5A through 5G in one or more transmissions, e.g., in the beacon 320, in the trigger frame 332, or other types of transmissions between the AP 102 and the STAs 104. The data packet(s) are then created or included within one or more of the transmission(s).

Thus, the AP 102 can determine or establish a portion or the entirety of UL MU transmission parameters as one or more of, but not limited to:

A global value/range for a transmission parameter(s);
A maximum or minimum limit on the value/range for a transmission parameter(s);
A dependency between two or more transmission parameters based on the STA 104 selected;
Based on the transmission type (for example, MU MIMO, OFDMA, etc.)
A combination with other MPDU/MSDU restriction(s);
Based on current transmission parameters (for example, remaining TXOP duration);
A combination with traffic and QoS parameter(s) and/or restriction(s);
Based on the STA 104 operation mode (for example, a STA on power save mode); and/or
Based on TF 206 and/or resource allocation information element format.

The AP 102 may then send the parameter limits, in step 620, to the one or more STAs 104. To provide the UL MU parameter limits, the AP 102 may broadcast the UL MU parameter limits to all STAs 104, to a group of STAs 104, or may send the UL MU parameter limits directly to one or more of the STAs 104.

The AP 102 may send the UL MU parameters using one or more of the following methodologies.

In a broadcast transmission (for example, in Beacons 320)
As a response to a capability request (for example, in a Probe Response)
In a specific allocation frame (for example, TF 206/332) for all STAs 104 participating in UL MU transmission
In a specific allocation frame (for example TF 206/332) for a specific set of STAs 104 participating in UL MU transmission
In a specific allocation frame (for example TF 206/332) for a single STA 104 (specific value per STA 104) participating in UL transmission.

In some configurations, the STA 104 can negotiate/renegotiate a specific set of UL MU restrictions by defining a value or an operating set of UL MU transmission parameters (listed earlier) during the STAs 104 association and/or during a traffic stream establishment. The UL MU transmission parameters can be negotiated at any one of the following instances: during association of the STA 104 with the network 103; during traffic stream establishment/modification; during another type of indication (for example, during a link condition change). The negotiation may also determine the parameter changes per traffic stream. In other words, each traffic stream may have a unique set of parameters negotiated between the AP 102 and the STA 104. Thus, the STA 104 can provide feedback about the UL MU transmission parameters and offer suggestions to the AP 102. The AP 102 may decide to change or modify the provided UL MU transmission parameters based on the feedback from the STA 104.

These UL MU parameter transmissions may be sent, set by the one or more STAs 104, and then maintained for some duration, as described in conjunction with the FIG. 5B. The method 600 may then proceed back to receiving data 608 to again determine if the process should be repeated or whether the changes have met the current needs and end.

Figure 7:
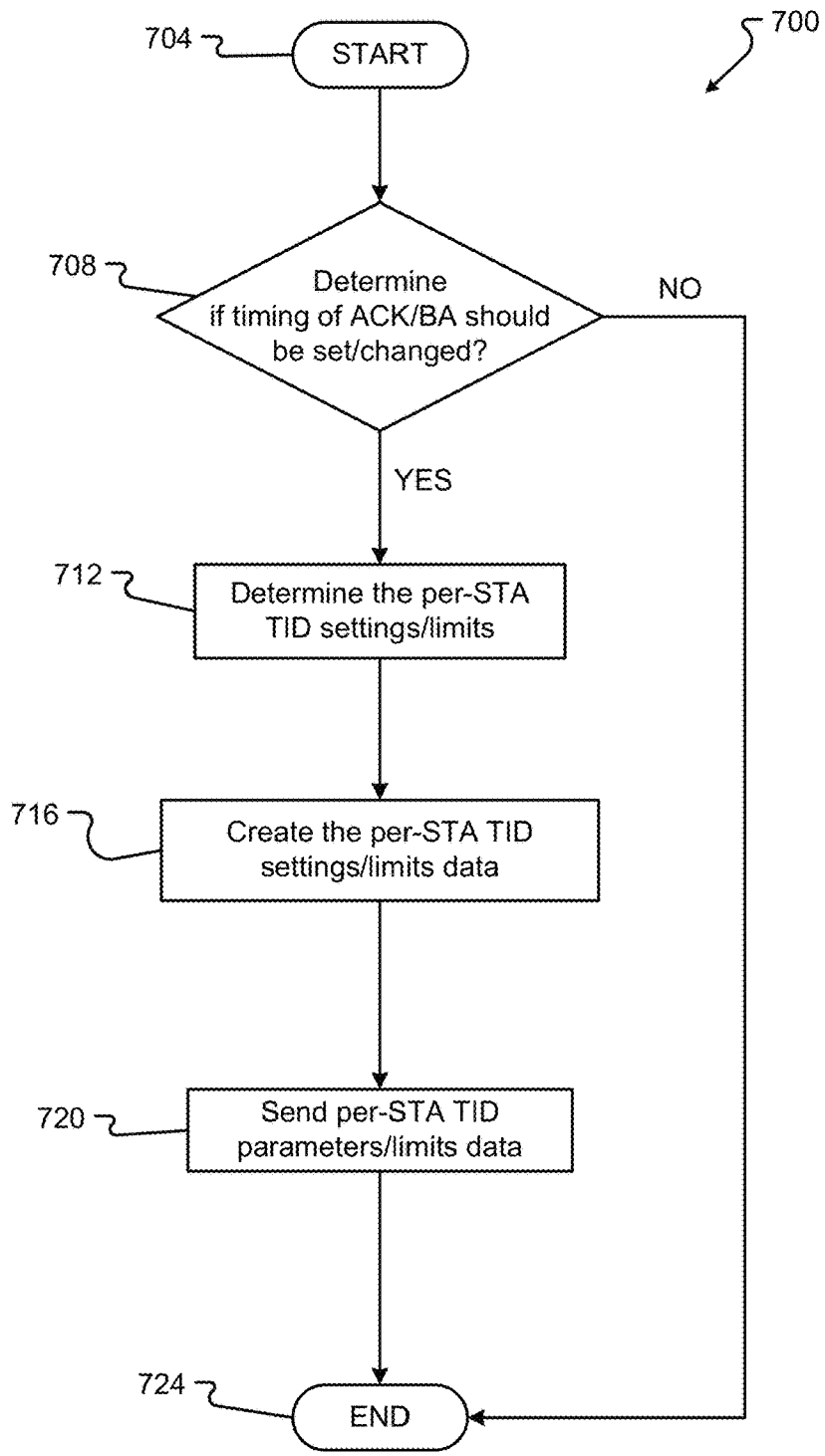
FIG. 7 is a flowchart illustrating an embodiment of a method for sending a UL MU parameter associated with a per-STA TID allocation.

A method 700 for determining whether the UL MU parameter(s), specifically the PSTL, should be changed is shown in FIG. 7. Generally, the method 700 starts with a start operation 704 and ends with an end operation 724. The method 700 can include more or fewer steps or can arrange the order of the steps differently than those shown in FIG. 7. The method 700 can be executed as a set of computer-executable instructions, executed by a computer system or processing component, and be encoded or stored on a storage medium. Further, the method 700 can be executed by a gate or other hardware device or component in an ASIC, a FPGA, or other type of hardware device. Hereinafter, the method 700 shall be explained with reference to the systems, components, modules, software, data structures, etc. described herein. The method 700 is directed to a specific example of changing the UL MU parameters based on the number of traffic stream identifiers or TIDs used in each of the A-MPDUs.

The AP 102 may associate one or more STAs 104 with the WLAN 103.

Then, the AP 102 may receive UL data and/or obtain or retrieve other data from and/or about one or more STAs 104 for determining whether to change or set the PSTL. For example, the AP 102 may determine if the timing of the ACK/BA frame should be changed or set by limiting the number TIDs that may be sent in any A-MPDU, in step 708. The data used by the AP 102 to determine whether to change or set the UL MU parameters can include the maximum TXOP 216 duration, the maximum number of STAs 104 assigned resources for UL frame transmissions, the number of ACs allowed in traffic streams for UL transmissions, the negotiated number of TIDs from STAs 104 assigned by a TF 206, etc. This data and/or other data may then be analyzed by the AP 102 to determine whether to change or set the PSTL.

Generally, the AP 102 determines if the PSTL needs to be set in step 708. By analyzing the received or determined data, the AP 102 can determine if changes need to be made to provide proper Quality of Service (QoS) to the one or more STAs 104 or to deal with the density of the WLAN 103. If the AP 102 determines that the PSTL needs to be changed or set, the method 700 proceeds YES to step 712. However, if the AP 102 determines that no changes need to be made, the method 700 proceeds NO to end step 724.

In step 712, the AP 102 can determine what the PSTL should be. The PSTL may be the same or similar to the PSTL described in conjunction with FIG. 5F. Determining whether to change the PSTL can be based on several criteria as explained above. These determinations may have predetermined limits or benchmarks that indicate a change in the PSTL must be made. Further, the AP 102 can review any combination of these determinations to decide that the PSTL needs to be changed.

Once the determined PSTL is identified, the AP 102 may create a PSTL data packet or packets, in step 716. The AP 102 can change any of the PSTL data described in FIGS. 5A through 5G in one or more transmissions, e.g., in the beacon 320, in the trigger frame 206/332, or other types of transmissions between the AP 102 and the STAs 104. The data packet(s) are then created or included within one or more of the transmission(s).

Thus, the AP 102 can determine or establish a PSTL as one or more of, but not limited to:

A global value/range for all TIDs;
A limit for a TID subset (e.g., for a particular transmission);
Based on the transmission type (for example, MU MIMO, OFDMA, etc.)
A combination with other MPDU/MSDU restriction(s) (e.g., single or double aggregation);
Based on current transmission parameters (for example, remaining TXOP duration);
A combination with traffic and QoS parameter(s) and/or restriction(s); and/or
Based on the STA 104 operation mode (for example, a STA 104 on power save mode).

The AP 102 may then send the PSTL, in step 720, to the one or more STAs 104. To provide the PSTL, the AP 102 may broadcast the PSTL to all STAs 104, to a group of STAs 104, or may send the PSTL directly to one or more of the STAs 104.

The AP 102 may send the PSTL using one or more of the following methodologies.

In a broadcast transmission (for example, in Beacons 320)
As a response to a capability request (for example, in a Probe Response)
In a specific allocation frame (for example, TF 206/332) for all STAs 104 participating in UL MU transmission
In a specific allocation frame (for example TF 206/332) for a specific set of STAs 104 participating in UL MU transmission
In specific allocation frame (for example TF 206/332) for a single STA 104 (specific value per STA 104) participating in UL transmission.

In some configurations, the STA 104 can negotiate/renegotiate a specific set of UL MU restrictions by defining a value or an operating set of UL MU transmission parameters (listed earlier) during the STAs 104 association and/or during a traffic stream establishment. Thus, the STA 104 can provide feedback about the UL MU transmission parameters and offer suggestions to the AP 102. The maximum number of TIDs limit per STA can be negotiated at any one of the following instances: during association of the STA 104 with the network 103; during traffic stream establishment/modification; and/or during another type of indication (for example, during a link condition change). The AP 102 may decide to change or modify the provided PSTL based on the feedback from the STA 104. These PSTL transmissions may be sent, set by the one or more STAs 104, and then maintained for some duration, as described in conjunction with the FIG. 5F. The method 700 may then proceed back to receiving data 708 to again determine if the process should be repeated or whether the changes have met the current needs and end.

Figure 8:
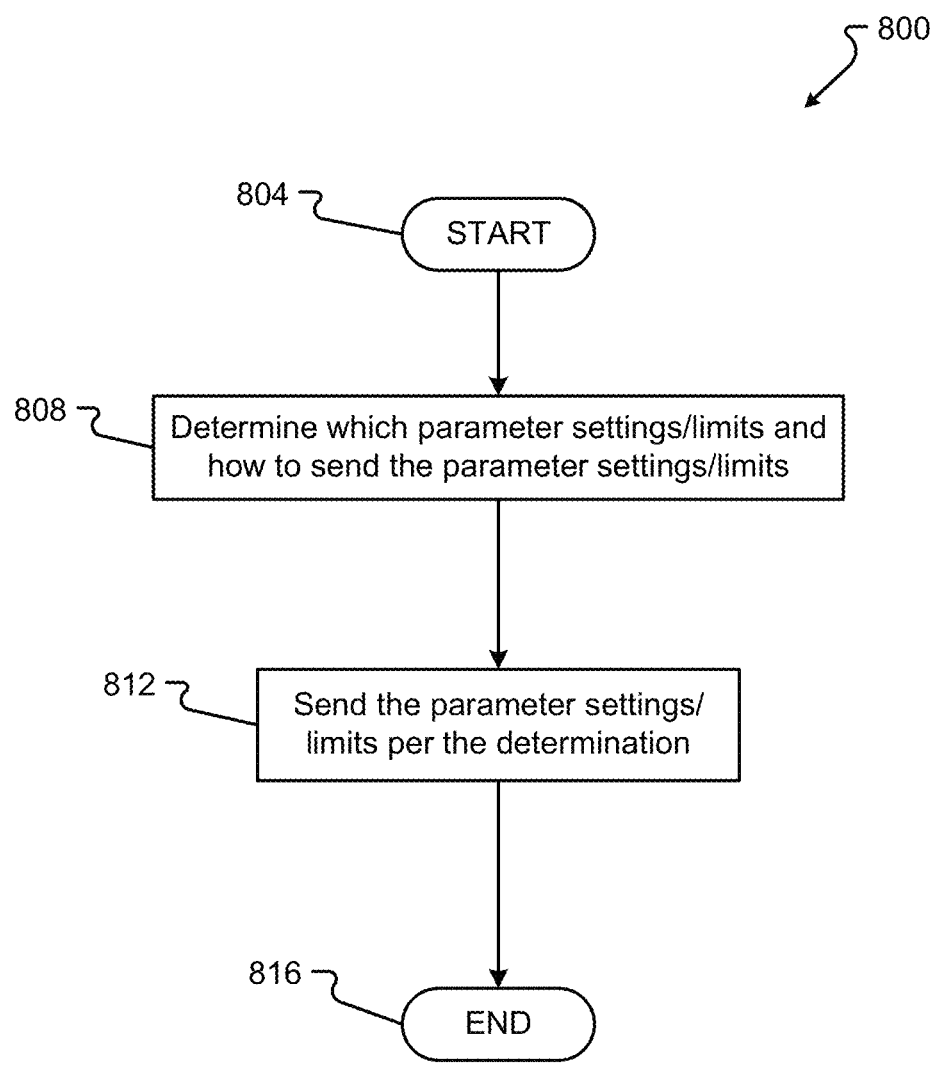
FIG. 8 is a flowchart illustrating an embodiment of a method for sending UL MU parameters.

An embodiment of a method 800 for sending the UL MU parameters (including the PSTL) may be as shown in FIG. 8. Generally, the method 800 starts with a start operation 804 and ends with an end operation 816. The method 800 can include more or fewer steps or can arrange the order of the steps differently than those shown in FIG. 8. The method 800 can be executed as a set of computer-executable instructions, executed by a computer system or processing component, and be encoded or stored on a storage medium. Further, the method 800 can be executed by a gate or other hardware device or component in an ASIC, a FPGA, or other type of hardware device. Hereinafter, the method 800 shall be explained with reference to the systems, components, modules, software, data structures, etc. described herein.

The AP 102, in steps 808, may determine what data needs to be sent and how to send the data. The data may be sent together in a single transmission within a single frame, such as a trigger frame 206, or may be separated into two or more portions and transmitted in two or more separate transmissions. This determination of how to send the data may be based on the amount of data or packet size available for sending this information in the different types of transmissions from the AP 102 to the STAs 104. For example, low bandwidth, large applicable data or broadcast data may be sent in a beacon frame 320, where more specific data may be sent in the trigger frame 206/332. The determination of how to send the UL MU transmission parameters is made by the AP 102, and then the data is sent in the one or more frames or data packets in step 812.

Figure 9:
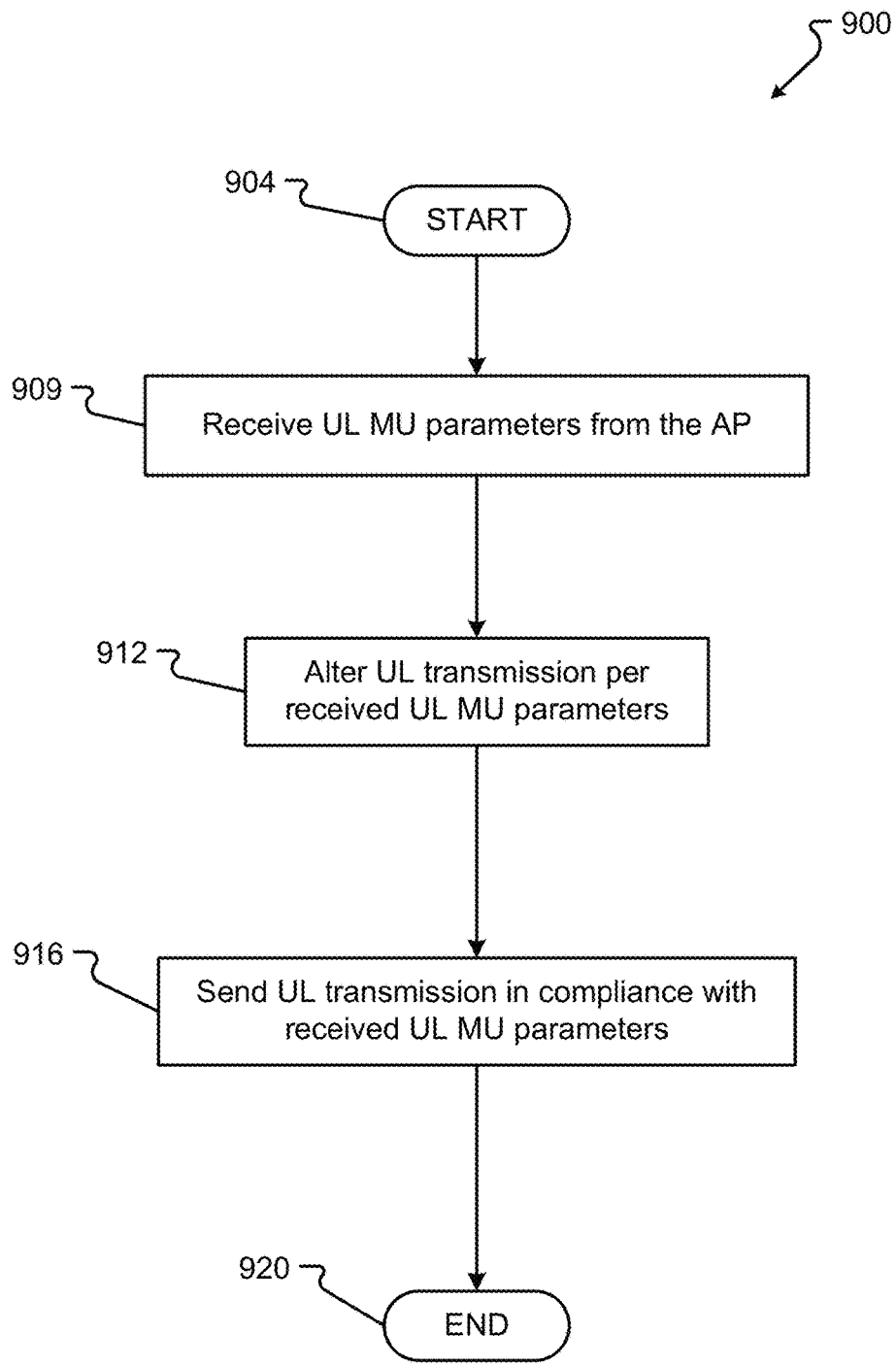
FIG. 9 is a flowchart illustrating an embodiment of a method for receiving UL MU parameters.

A method 900 for a STA receiving the UL MU parameters is as shown in FIG. 9. Generally, the method 900 starts with a start operation 904 and ends with an end operation 920. The method 900 can include more or fewer steps or can arrange the order of the steps differently than those shown in FIG. 9. The method 900 can be executed as a set of computer-executable instructions, executed by a computer system or processing component, and be encoded or stored on a storage medium. Further, the method 900 can be executed by a gate or other hardware device or component in an ASIC, a FPGA, or other type of hardware device. Hereinafter, the method 900 shall be explained with reference to the systems, components, modules, software, data structures, etc. described herein.

In step 908, the STA 104 receives the UL MU parameter (possibly including the PSTL) changes from the AP 102. The STA 104 may read the data from the received transmission and extract that information. In step 912, the STA 104 may alter how the STA 104 conducts UL transmissions based on the new parameters. These changes may affect how packets are created or how transmissions are executed for each STA 104. Each STA 104 may have a different type of change based on how the UL MU parameters were associated with that particular STA 104. Thus, each STA 104 within the WLAN 103 may change how it transmits data to the AP 102. The different STAs 104 may then send the UL transmissions, in step 916. These transmissions may be as directed or managed by the AP 102 through the UL MU parameters.

Figure 10:
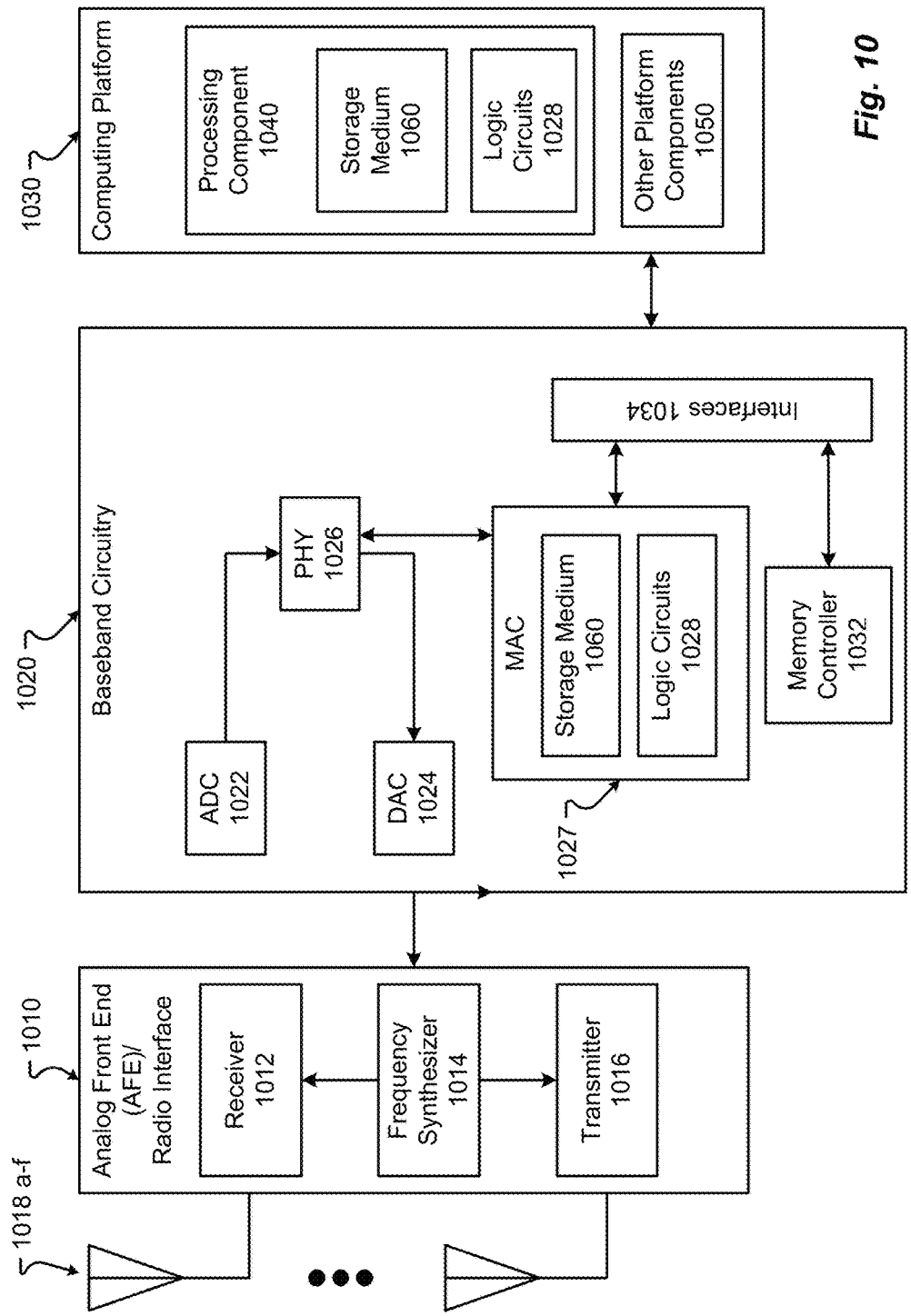
FIG. 10 is a block diagram illustrating components of a STA and/or AP.

FIG. 10 illustrates an embodiment of a communications device 1000 that may implement one or more of AP 102 and STAs 104a-104d of FIG. 1. In various embodiments, device 1000 may comprise a logic circuit 1028. The logic circuit 1028 may include physical circuits to perform operations described for one or more of AP 102 and STAs 104a-104d of FIG. 1, for example. As shown in FIG. 10, device 1000 may include one or more of, but is not limited to, a radio interface 1010, baseband circuitry 1020, and/or computing platform 1030.

The device 1000 may implement some or all of the structure and/or operations for one or more of AP 102 and STAs 104a-104d of FIG. 1, storage medium 1060, and logic circuit 1028 in a single computing entity, such as entirely within a single device. Alternatively, the device 1000 may distribute portions of the structure and/or operations for one or more of AP 102 and STAs 104a-104d of FIG. 1, storage medium 1060, and logic circuit 1028 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems.

An analog front end (AFE)/radio interface 1010 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the configurations are not limited to any specific over-the-air interface or modulation scheme. AFE/Radio interface 1010 may include, for example, a receiver 1012, a frequency synthesizer 1014, and/or a transmitter 1016. AFE/Radio interface 1010 may include bias controls, a crystal oscillator, and/or one or more antennas 1018-f. In additional or alternative configurations, the AFE/Radio interface 1010 may use external voltage-controlled oscillators (VCOs), surface acoustic wave filters, intermediate frequency (IF) filters and/or RF filters, as desired.

Baseband circuitry 1020 may communicate with AFE/Radio interface 1010 to process, receive, and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1026 for the PHY link layer processing of respective receive/transmit signals. Baseband circuitry 1020 may include, for example, a medium access control (MAC) processing circuit 1027 for MAC/data link layer processing. Baseband circuitry 1020 may include a memory controller 1032 for communicating with MAC processing circuit 1027 and/or a computing platform 1030, for example, via one or more interfaces 1034.

In some configurations, PHY processing circuit 1026 may include a frame construction and/or detection module, in combination with additional circuitry such as a buffer memory, to construct and/or deconstruct communication frames. Alternatively or in addition, MAC processing circuit 1027 may share processing for certain of these functions or perform these processes independent of PHY processing circuit 1026. In some configurations, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for one or more of AP 102 and STAs 104a-104, storage medium 1060, and logic circuit 1028 using the processing component 1040. The processing component 1040 (and/or PHY 1026 and/or MAC 1027) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units 1060 may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired.

Embodiments of device 1000 may be implemented using single input single output (SISO) architectures. However, certain implementations may include multiple antennas (e.g., antennas 1018-*f*) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware, and/or software elements may be collectively or individually referred to herein as "logic," "circuit," or "processor."

The device in FIG. 10 can also contain a security module (not shown). This security module can contain information regarding, but not limited to, security parameters required to connect the device to another device or other available networks or network devices, and can include WEP or WPA security access keys, network keys, etc., as discussed.

Another module that the device in FIG. 10 can include is a network access unit (not shown). The network access unit can be used for connecting with another network device. In one example, connectivity can include synchronization between devices. In another example, the network access unit can work as a medium which provides support for communication with other stations. In yet another example, the network access unit can work in conjunction with at least the MAC circuitry 1027. The network access unit can also work and interact with one or more of the modules/components described herein.

It should be appreciated that the exemplary device 1000 shown in the block diagram of FIG. 10 may represent one functionally descriptive example of many potential implementations. Accordingly, division, omission, or inclusion of block functions depicted in the accompanying figures does not infer that the hardware components, circuits, software and/or elements for implementing these functions would be necessarily be divided, omitted, or included in embodiments.

Exemplary aspects are directed toward:
A wireless device comprising:
baseband circuitry configured to:
generate one or more fields of a packet that comprise one or more transmission parameters associated with at least one uplink (UL) multi-user (MU) transmission opportunity (TxOP);
transmit the packet to one or more stations; and
transmit a trigger frame to the one or more stations to indicate the TxOP, wherein the one or more stations transmit to the master station, during the TxOP, in accordance with the one or more transmission parameters.

Any one or more of the above aspects, wherein the one or more transmission parameters comprises one or more of: a station identifier, a group identifier, a timing period, a type of aggregation for media access control (MAC) service data units (MSDUs) or MAC protocol data units (MPDU), a sequence for MPDUs, an A-MPDU duration, a minimum number of bits or bytes for each A-MPDU, a maximum number of bits or bytes for each A-MPDU, a minimum number of bits or bytes for each MPDU, a maximum number of bits or bytes for each MPDU, a density for the A-MPDU, a MPDU duration, a minimum number of bits or bytes for each MSDU, a maximum number of bits or bytes for each MSDU, a density for the MPDUs, a duration for the MSDU, a density for the MSDUs, a minimum number of MSDUs in each MPDU, a maximum number of MSDUs in each MPDU, a traffic identifier (TID) and/or access category (AC) priority, an allocation order, a priority per TID and/or AC, a priority between TIDs and/or ACs, a serving limit for TIDs and/or ACs, TID limits, modulation and coding scheme as a function of TID and/or AC, power as a function of TID and/or AC, a number of spatial streams (NSS) and/or antenna chains for each station, contention period (CP), and/or a total transmission duration.

Any one or more of the above aspects, wherein one or more of the transmission parameters are negotiated with the one or more stations.

Any one or more of the above aspects, wherein the TID limits includes a per-station TID limit (PSTL).

Any one or more of the above aspects, wherein the one or more of the transmission parameters are one or more of the following:
a global value;
a global range;
a maximum limit on a value or a range;
a minimum limit on a value or a range;
a dependency between two or more transmission parameters based on the station selected;
based on the transmission type;
a combination with at least one other MPDU/MSDU restriction;
based on a current transmission parameters;
a combination including a traffic and/or a Quality of Service (QoS) parameter and/or restriction;
based on the station operation mode; and/or
based on a trigger frame and/or resource allocation information element format.

Any one or more of the above aspects, wherein the packet is at least a portion of a beacon frame, an association response, a traffic service response, or a probe response.

Any one or more of the above aspects, wherein the baseband circuitry comprises physical layer and medium access control layer circuitry, wherein the physical layer and medium access control layer circuitry further comprises:
a transceiver coupled to the physical layer and medium access control layer circuitry; and
one or more antennas coupled to the transceiver configured to receive the transmission from the one or more stations in accordance with the one or more transmission parameters.

Any one or more of the above aspects, further comprising one or more of an analog front end, a security module, storage, one or more antennas, MAC circuitry, and a network access unit.

A non-transitory computer-readable storage media that stores instructions for execution by one or more processors to perform operations for managing an uplink (UL) multi-user (MU) transmission opportunity (TxOP), the instructions comprising:
instructions to generate one or more fields of a packet that comprise one or more transmission parameters associated with at least one uplink (UL) multi-user (MU) transmission opportunity (TxOP);

instructions to transmit the packet to one or more stations; and instructions to transmit a trigger frame to the one or more stations to indicate the TxOP, wherein the one or more stations transmit to the master station, during the TxOP, in accordance with the one or more transmission parameters.

Any one or more of the above aspects, wherein the one or more transmission parameters comprises one or more of: a station identifier, a group identifier, a timing period, a type of aggregation for media access control (MAC) service data units (MSDUs) or MAC protocol data units (MPDU), a sequence for MPDUs, an A-MPDU duration, a minimum number of bits or bytes for each A-MPDU, a maximum number of bits or bytes for each A-MPDU, a minimum number of bits or bytes for each MPDU, a maximum number of bits or bytes for each MPDU, a density for the A-MPDU, a MPDU duration, a minimum number of bits or bytes for each MSDU, a maximum number of bits or bytes for each MSDU, a density for the MPDUs, a duration for the MSDU, a density for the MSDUs, a minimum number of MSDUs in each MPDU, a maximum number of MSDUs in each MPDU, a traffic identifier (TID) and/or access category (AC) priority, an allocation order, a priority per TID and/or AC, a priority between TIDs and/or ACs, a serving limit for TIDs and/or ACs, TID limits, modulation and coding scheme as a function of TID and/or AC, power as a function of TID and/or AC, a number of spatial streams (NSS) and/or antenna chains for each station, contention period (CP), and/or a total transmission duration.

Any one or more of the above aspects, wherein the one or more of the transmission parameters are one or more of the following:

a global value;
a global range;
a maximum limit on a value or a range;
a minimum limit on a value or a range;
a dependency between two or more transmission parameters based on the station selected;
based on the transmission type;
a combination with at least one other MPDU/MSDU restriction;
based on a current transmission parameters;
a combination including a traffic and/or a Quality of Service (QoS) parameter and/or restriction;
based on the station operation mode; and/or
based on a trigger frame and/or resource allocation information element format.

Any one or more of the above aspects, wherein the packet is at least a portion of a beacon frame, an association response, a traffic service response, or a probe response.

A method performed by a high efficiency (HE) wireless device, the method comprising:
receiving a packet from an access point that comprises one or more transmission parameters for an uplink (UL) multi-user (MU) transmission opportunity (TxOP);
altering one or more functions of the HE wireless device to transmit data to the access point in accordance with the one or more transmission parameters;
receiving a trigger frame from the access point to indicate the TxOP, wherein the TxOP operates in accordance with the one or more transmission parameters; and
transmitting, in the TxOP, in accordance with the one or more transmission parameters.

Any one or more of the above aspects, wherein the one or more transmission parameters comprises one or more of: a station identifier, a group identifier, a timing period, a type of aggregation for media access control (MAC) service data units (MSDUs) or MAC protocol data units (MPDU), a sequence for MPDUs, an A-MPDU duration, a minimum number of bits or bytes for each A-MPDU, a maximum number of bits or bytes for each A-MPDU, a minimum number of bits or bytes for each MPDU, a maximum number of bits or bytes for each MPDU, a density for the A-MPDU, a MPDU duration, a minimum number of bits or bytes for each MSDU, a maximum number of bits or bytes for each MSDU, a density for the MPDUs, a duration for the MSDU, a density for the MSDUs, a minimum number of MSDUs in each MPDU, a maximum number of MSDUs in each MPDU, a traffic identifier (TID) and/or access category (AC) priority, an allocation order, a priority per TID and/or AC, a priority between TIDs and/or ACs, a serving limit for TIDs and/or ACs, TID limits, modulation and coding scheme as a function of TID and/or AC, power as a function of TID and/or AC, a number of spatial streams (NSS) and/or antenna chains for each station, contention period (CP), and/or a total transmission duration.

Any one or more of the above aspects, wherein the one or more of the transmission parameters are one or more of the following:

a global value;
a global range;
a maximum limit on a value or a range;
a minimum limit on a value or a range;
a dependency between two or more transmission parameters based on the station selected;
based on the transmission type;
a combination with at least one other MPDU/MSDU restriction;
based on a current transmission parameters;
a combination including a traffic and/or a Quality of Service (QoS) parameter and/or restriction;
based on the station operation mode; and/or
based on a trigger frame and/or resource allocation information element format.

Any one or more of the above aspects, wherein the packet is received in at least a portion of a beacon frame, an association response, a traffic service response, or a probe response.

Any one or more of the above aspects, further comprising negotiating with the access point to change at least one of the one or more of the transmission parameters.

Any one or more of the above aspects, wherein the TID limits includes a per-station TID limit (PSTL).

A wireless device comprising:
baseband circuitry configured to:
receive a packet from an access point that comprises one or more transmission parameters for an uplink (UL) multi-user (MU) transmission opportunity (TxOP);
alter one or more functions of the HE wireless device to transmit data to the access point in accordance with the one or more transmission parameters;
receive a trigger frame from the access point to indicate the TxOP, wherein the TxOP operates in accordance with the one or more transmission parameters; and
transmit, in the TxOP, in accordance with the one or more transmission parameters.

Any one or more of the above aspects, wherein one or more of the transmission parameters are negotiated with the access point.

Any one or more of the above aspects, wherein the one or more transmission parameters comprises one or more of: a station identifier, a group identifier, a timing period, a type of aggregation for media access control (MAC) service data units (MSDUs) or MAC protocol data units (MPDU), a sequence for MPDUs, an A-MPDU duration, a minimum number of bits or bytes for each A-MPDU, a maximum number of bits or bytes for each A-MPDU, a minimum number of bits or bytes for each MPDU, a maximum number of bits or bytes for each MPDU, a density for the A-MPDU, a MPDU duration, a minimum number of bits or bytes for each MSDU, a maximum number of bits or bytes for each MSDU, a density for the MPDUs, a duration for the MSDU, a density for the MSDUs, a minimum number of MSDUs in each MPDU, a maximum number of MSDUs in each MPDU, a traffic identifier (TID) and/or access category (AC) priority, an allocation order, a priority per TID and/or AC, a priority between TIDs and/or ACs, a serving limit for TIDs and/or ACs, TID limits, modulation and coding scheme as a function of TID and/or AC, power as a function of TID and/or AC, a number of spatial streams (NSS) and/or antenna chains for each station, contention period (CP), and/or a total transmission duration.

Any one or more of the above aspects, wherein the packet is received in at least a portion of a beacon frame, an association response, a traffic service response, or a probe response.

Any one or more of the above aspects, wherein the TID limits includes a per-station TID limit (PSTL).

Any one or more of the above aspects, wherein the one or more of the transmission parameters are one or more of the following:

a global value;
a global range;
a maximum limit on a value or a range;
a minimum limit on a value or a range;
a dependency between two or more transmission parameters based on the station selected;
based on the transmission type;
a combination with at least one other MPDU/MSDU restriction;
based on a current transmission parameters;
a combination including a traffic and/or a Quality of Service (QoS) parameter and/or restriction;
based on the station operation mode; and/or
based on a trigger frame and/or resource allocation information element format.

Any one or more of the above aspects, wherein the baseband circuitry comprises physical layer and medium access control layer circuitry, wherein the physical layer and medium access control layer circuitry further comprises:

a transceiver coupled to the physical layer and medium access control layer circuitry; and one or more antennas coupled to the transceiver configured to transmit the transmission from the one or more stations in accordance with the one or more transmission parameters.

Any one or more of the above aspects, further comprising one or more of an analog front end, a security module, storage, one or more antennas, MAC circuitry, and a network access unit.

A wireless device comprising:

means for generating one or more fields of a packet that comprise one or more transmission parameters associated with at least one uplink (UL) multi-user (MU) transmission opportunity (TxOP);

means for transmitting the packet to one or more stations; and means for transmitting a trigger frame to the one or more stations to indicate the TxOP, wherein the one or more stations transmit to the master station, during the TxOP, in accordance with the one or more transmission parameters.

Any one or more of the above aspects, wherein the one or more transmission parameters comprises one or more of: a station identifier, a group identifier, a timing period, a type of aggregation for media access control (MAC) service data units (MSDUs) or MAC protocol data units (MPDU), a sequence for MPDUs, an A-MPDU duration, a minimum number of bits or bytes for each A-MPDU, a maximum number of bits or bytes for each A-MPDU, a minimum number of bits or bytes for each MPDU, a maximum number of bits or bytes for each MPDU, a density for the A-MPDU, a MPDU duration, a minimum number of bits or bytes for each MSDU, a maximum number of bits or bytes for each MSDU, a density for the MPDUs, a duration for the MSDU, a density for the MSDUs, a minimum number of MSDUs in each MPDU, a maximum number of MSDUs in each MPDU, a traffic identifier (TID) and/or access category (AC) priority, an allocation order, a priority per TID and/or AC, a priority between TIDs and/or ACs, a serving limit for TIDs and/or ACs, TID limits, modulation and coding scheme as a function of TID and/or AC, power as a function of TID and/or AC, a number of spatial streams (NSS) and/or antenna chains for each station, contention period (CP), and/or a total transmission duration.

Any one or more of the above aspects, wherein one or more of the transmission parameters are negotiated with the one or more stations.

Any one or more of the above aspects, wherein the TID limits includes a per-station TID limit (PSTL).

Any one or more of the above aspects, wherein the one or more of the transmission parameters are one or more of the following:

a global value;
a global range;
a maximum limit on a value or a range;
a minimum limit on a value or a range;
a dependency between two or more transmission parameters based on the station selected;
based on the transmission type;
a combination with at least one other MPDU/MSDU restriction;
based on a current transmission parameters;
a combination including a traffic and/or a Quality of Service (QoS) parameter and/or restriction;
based on the station operation mode; and/or
based on a trigger frame and/or resource allocation information element format.

Any one or more of the above aspects, wherein the packet is at least a portion of a beacon frame, an association response, a traffic service response, or a probe response.

Any one or more of the above aspects, further comprising means for receiving a transmission from the one or more stations in accordance with the one or more transmission parameters.

Any one or more of the above aspects, further comprising means for an analog front end, a security module, storage, one or more antennas, MAC circuitry, and a network access unit.

A method comprising:

generating one or more fields of a packet that comprise one or more transmission parameters associated with at least one uplink (UL) multi-user (MU) transmission opportunity (TxOP);

transmitting the packet to one or more stations; and transmitting a trigger frame to the one or more stations to indicate the TxOP, wherein the one or more stations transmit to the master station, during the TxOP, in accordance with the one or more transmission parameters.

Any one or more of the above aspects, wherein the one or more transmission parameters comprises one or more of: a station identifier, a group identifier, a timing period, a type of aggregation for media access control (MAC) service data units (MSDUs) or MAC protocol data units (MPDU), a sequence for MPDUs, an A-MPDU duration, a minimum number of bits or bytes for each A-MPDU, a maximum number of bits or bytes for each A-MPDU, a minimum number of bits or bytes for each MPDU, a maximum number of bits or bytes for each MPDU, a density for the A-MPDU, a MPDU duration, a minimum number of bits or bytes for each MSDU, a maximum number of bits or bytes for each MSDU, a density for the MPDUs, a duration for the MSDU, a density for the MSDUs, a minimum number of MSDUs in each MPDU, a maximum number of MSDUs in each MPDU, a traffic identifier (TID) and/or access category (AC) priority, an allocation order, a priority per TID and/or AC, a priority between TIDs and/or ACs, a serving limit for TIDs and/or ACs, TID limits, modulation and coding scheme as a function of TID and/or AC, power as a function of TID and/or AC, a number of spatial streams (NSS) and/or antenna chains for each station, contention period (CP), and/or a total transmission duration.

Any one or more of the above aspects, wherein the one or more of the transmission parameters are one or more of the following:
 a global value;
 a global range;
 a maximum limit on a value or a range;
 a minimum limit on a value or a range;
 a dependency between two or more transmission parameters based on the station selected;
 based on the transmission type;
 a combination with at least one other MPDU/MSDU restriction;
 based on a current transmission parameters;
 a combination including a traffic and/or a Quality of Service (QoS) parameter and/or restriction;
 based on the station operation mode; and/or
 based on a trigger frame and/or resource allocation information element format.

Any one or more of the above aspects, wherein the packet is at least a portion of a beacon frame, an association response, a traffic service response, or a probe response.

A non-transitory computer-readable storage media that stores instructions for execution by one or more processors to perform operations for transmitting in an uplink (UL) multi-user (MU) transmission opportunity (TxOP), the instructions comprising:
 instructions to receive a packet from an access point that comprises one or more transmission parameters for an uplink (UL) multi-user (MU) transmission opportunity (TxOP);
 instructions to alter one or more functions of the HE wireless device to transmit data to the access point in accordance with the one or more transmission parameters;
 instructions to receive a trigger frame from the access point to indicate the TxOP, wherein the TxOP operates in accordance with the one or more transmission parameters; and
 instructions to transmit, in the TxOP, in accordance with the one or more transmission parameters.

Any one or more of the above aspects, wherein the one or more transmission parameters comprises one or more of: a station identifier, a group identifier, a timing period, a type of aggregation for media access control (MAC) service data units (MSDUs) or MAC protocol data units (MPDU), a sequence for MPDUs, an A-MPDU duration, a minimum number of bits or bytes for each A-MPDU, a maximum number of bits or bytes for each A-MPDU, a minimum number of bits or bytes for each MPDU, a maximum number of bits or bytes for each MPDU, a density for the A-MPDU, a MPDU duration, a minimum number of bits or bytes for each MSDU, a maximum number of bits or bytes for each MSDU, a density for the MPDUs, a duration for the MSDU, a density for the MSDUs, a minimum number of MSDUs in each MPDU, a maximum number of MSDUs in each MPDU, a traffic identifier (TID) and/or access category (AC) priority, an allocation order, a priority per TID and/or AC, a priority between TIDs and/or ACs, a serving limit for TIDs and/or ACs, TID limits, modulation and coding scheme as a function of TID and/or AC, power as a function of TID and/or AC, a number of spatial streams (NSS) and/or antenna chains for each station, contention period (CP), and/or a total transmission duration.

Any one or more of the above aspects, wherein the one or more of the transmission parameters are one or more of the following:
 a global value;
 a global range;
 a maximum limit on a value or a range;
 a minimum limit on a value or a range;
 a dependency between two or more transmission parameters based on the station selected;
 based on the transmission type;
 a combination with at least one other MPDU/MSDU restriction;
 based on a current transmission parameters;
 a combination including a traffic and/or a Quality of Service (QoS) parameter and/or restriction;
 based on the station operation mode; and/or
 based on a trigger frame and/or resource allocation information element format.

Any one or more of the above aspects, wherein the packet is received in at least a portion of a beacon frame, an association response, a traffic service response, or a probe response.

Any one or more of the above aspects, further comprising instructions to negotiate with the access point to change at least one of the one or more of the transmission parameters.

Any one or more of the above aspects, wherein the TID limits includes a per-station TID limit (PSTL).

A wireless device comprising:
 means for receiving a packet from an access point that comprises one or more transmission parameters for an uplink (UL) multi-user (MU) transmission opportunity (TxOP);
 means for altering one or more functions of the HE wireless device to transmit data to the access point in accordance with the one or more transmission parameters;
 means for receiving a trigger frame from the access point to indicate the TxOP, wherein the TxOP operates in accordance with the one or more transmission parameters; and
 means for transmitting, in the TxOP, in accordance with the one or more transmission parameters.

Any one or more of the above aspects, wherein one or more of the transmission parameters are negotiated with the access point.

Any one or more of the above aspects, wherein the one or more transmission parameters comprises one or more of: a station identifier, a group identifier, a timing period, a type of aggregation for media access control (MAC) service data units (MSDUs) or MAC protocol data units (MPDU), a sequence for MPDUs, an A-MPDU duration, a minimum number of bits or bytes for each A-MPDU, a maximum number of bits or bytes for each A-MPDU, a minimum number of bits or bytes for each MPDU, a maximum number of bits or bytes for each MPDU, a density for the A-MPDU, a MPDU duration, a minimum number of bits or bytes for each MSDU, a maximum number of bits or bytes for each MSDU, a density for the MPDUs, a duration for the MSDU, a density for the MSDUs, a minimum number of MSDUs in each MPDU, a maximum number of MSDUs in each MPDU, a traffic identifier (TID) and/or access category (AC) priority, an allocation order, a priority per TID and/or AC, a priority between TIDs and/or ACs, a serving limit for TIDs and/or ACs, TID limits, modulation and coding scheme as a function of TID and/or AC, power as a function of TID and/or AC, a number of spatial streams (NSS) and/or antenna chains for each station, contention period (CP), and/or a total transmission duration.

Any one or more of the above aspects, wherein the packet is received in at least a portion of a beacon frame, an association response, a traffic service response, or a probe response.

Any one or more of the above aspects, wherein the TID limits includes a per-station TID limit (PSTL).

Any one or more of the above aspects, wherein the one or more of the transmission parameters are one or more of the following:

a global value;
a global range;
a maximum limit on a value or a range;
a minimum limit on a value or a range;
a dependency between two or more transmission parameters based on the station selected;
based on the transmission type;
a combination with at least one other MPDU/MSDU restriction;
based on a current transmission parameters;
a combination including a traffic and/or a Quality of Service (QoS) parameter and/or restriction;
based on the station operation mode; and/or
based on a trigger frame and/or resource allocation information element format.

Any one or more of the above aspects, further comprising means for transmitting the transmission from the one or more stations in accordance with the one or more transmission parameters.

Any one or more of the above aspects, further comprising means for an analog front end, a security module, storage, one or more antennas, MAC circuitry, and a network access unit.

For purposes of explanation, numerous details are set forth in order to provide a thorough understanding of the present embodiments. It should be appreciated however that the techniques herein may be practiced in a variety of ways beyond the specific details set forth herein.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, WiFi, LTE, 4G, Bluetooth®, WirelessHD, WiGig, WiGi, 3GPP, Wireless LAN, WiMAX, and the like.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22nm Haswell, Intel® Core® i5-3570K 22nm Ivy Bridge, the AMD® FX™ family of processors, AMD® FX-4300, FX-6300, and FX-8350 32nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM1926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Provided herein are exemplary systems and methods for full- or half-duplex communications in a wireless device(s). While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A wireless device comprising:
baseband circuitry in a master station configured to:
generate one or more fields of a packet that comprise one or more transmission parameters associated with at least one uplink (UL) multi-user (MU) transmission opportunity (TxOP);
transmit the packet to one or more stations; and
transmit a trigger frame to the one or more stations to indicate the TxOP, wherein the one or more stations simultaneously transmit to the master station, during the TxOP, for a specific time period in accordance with: a location of where the one or more transmission parameters were received and the one or more transmission parameters.

2. The wireless device of claim 1, wherein the one or more transmission parameters comprises one or more of: a station identifier, a group identifier, an ACK policy per station, number of TIDs per station to be immediately acknowledged, a timing period, a type of aggregation for media access control (MAC) service data units (MSDUs) or MAC protocol data units (MPDU), a sequence for MPDUs, an A-MPDU duration, a minimum number of bits or bytes for each A-MPDU, a maximum number of bits or bytes for each A-MPDU, a minimum number of bits or bytes for each MPDU, a maximum number of bits or bytes for each MPDU, a density for the A-MPDU, a MPDU duration, a minimum number of bits or bytes for each MSDU, a maximum number of bits or bytes for each MSDU, a density for the MPDUs, a duration for the MSDU, a density for the MSDUs, a minimum number of MSDUs in each MPDU, a maximum number of MSDUs in each MPDU, a traffic identifier (TID) and/or access category (AC) priority, an allocation order, a priority per TID and/or AC, a priority between TIDs and/or ACs, a serving limit for TIDs and/or ACs, TID limits, modulation and coding scheme as a function of TID and/or AC, power as a function of TID and/or AC, a number of spatial streams (NSS) and/or antenna chains for each station, contention period (CP), and/or a total transmission duration.

3. The wireless device of claim 2, wherein one or more of the transmission parameters are negotiated with the one or more stations.

4. The wireless device of claim 2, wherein the TID limits includes a per-station TID limit (PSTL) that are immediately acknowledged.

5. The wireless device of claim 2, wherein the one or more of the transmission parameters are one or more of the following:
a global value;
a global range;
a maximum limit on a value or a range;
a minimum limit on a value or a range;
a dependency between two or more transmission parameters based on the station selected;
based on the transmission type;
a combination with at least one other MPDU/MSDU restriction;
based on a current transmission parameters;
a combination including a traffic and/or a Quality of Service (QoS) parameter and/or restriction;
based on the station operation mode; and/or
based on a trigger frame and/or resource allocation information element format.

6. The wireless device of claim 1, wherein the packet is at least a portion of a beacon frame, an association response, a traffic service response, or a probe response.

7. The wireless device of claim 1, wherein the baseband circuitry comprises physical layer and medium access control layer circuitry, wherein the physical layer and medium access control layer circuitry further comprises:
a transceiver coupled to the physical layer and medium access control layer circuitry; and
one or more antennas coupled to the transceiver configured to receive the transmission from the one or more stations in accordance with the one or more transmission parameters.

8. A non-transitory computer-readable storage media that stores instructions for execution by one or more processors to perform operations for managing an uplink (UL) multi-user (MU) transmission opportunity (TROP) to master station, the instructions comprising:
instructions to generate one or more fields of a packet that comprise one or more transmission parameters associated with at least one uplink (UL) multi-user (MU) transmission opportunity (TxOP);
instructions to transmit the packet to one or more stations; and
instructions to transmit a trigger frame to the one or more stations to indicate the TxOP, wherein the one or more stations simultaneously transmit to the master station, during the TxOP, for a specific time period in accordance with: a location of where the one or more transmission parameters were received and the one or more transmission parameters.

9. The media of claim 8, wherein the one or more transmission parameters comprises one or more of: a station identifier, a group identifier, an ACK policy per station, number of TIDs per station to be immediately acknowledged, a timing period, a type of aggregation for media access control (MAC) service data units (MSDUs) or MAC protocol data units (MPDU), a sequence for MPDUs, an A-MPDU duration, a minimum number of bits or bytes for each A-MPDU, a maximum number of bits or bytes for each A-MPDU, a minimum number of bits or bytes for each MPDU, a maximum number of bits or bytes for each MPDU, a density for the A-MPDU, a MPDU duration, a minimum number of bits or bytes for each MSDU, a maximum number of bits or bytes for each MSDU, a density for the MPDUs, a duration for the MSDU, a density for the MSDUs, a minimum number of MSDUs in each MPDU, a maximum number of MSDUs in each MPDU, a traffic identifier (TID) and/or access category (AC) priority, an allocation order, a priority per TID and/or AC, a priority between TIDs and/or ACs, a serving limit for TIDs and/or ACs, TID limits, modulation and coding scheme as a function of TID and/or AC, power as a function of TID and/or AC, a number of spatial streams (NSS) and/or antenna chains for each station, contention period (CP), and/or a total transmission duration.

10. The media of claim 9, wherein the one or more of the transmission parameters are one or more of the following:
   a global value;
   a global range;
   a maximum limit on a value or a range;
   a minimum limit on a value or a range;
   a dependency between two or more transmission parameters based on the station selected;
   based on the transmission type;
   a combination with at least one other MPDU/MSDU restriction;
   based on a current transmission parameters;
   a combination including a traffic and/or a Quality of Service (QoS) parameter and/or restriction;
   based on the station operation mode; and/or
   based on a trigger frame and/or resource allocation information element format.

11. The media of claim 10, wherein the packet is at least a portion of a beacon frame, an association response, a traffic service response, or a probe response.

12. A method performed by a high efficiency (HE) wireless device, the method comprising:
   receiving a packet from an access point that comprises one or more transmission parameters for an uplink (UL) multi-user (MU) transmission opportunity (TxOP);
   altering one or more functions of the HE wireless device to transmit data to the access point in accordance with the one or more transmission parameters;
   receiving a trigger frame from the access point to indicate the TxOP, wherein the TxOP operates in accordance with the one or more transmission parameters; and
   transmitting, in the TxOP, for a specific time period in accordance with: a location of where the one or more transmission parameters were received and the one or more transmission parameters.

13. The method of claim 12, wherein the one or more transmission parameters comprises one or more of: a station identifier, a group identifier, an ACK policy per station, number of TIDs per station to be immediately acknowledged, a timing period, a type of aggregation for media access control (MAC) service data units (MSDUs) or MAC protocol data units (MPDU), a sequence for MPDUs, an A-MPDU duration, a minimum number of bits or bytes for each A-MPDU, a maximum number of bits or bytes for each A-MPDU, a minimum number of bits or bytes for each MPDU, a maximum number of bits or bytes for each MPDU, a density for the A-MPDU, a MPDU duration, a minimum number of bits or bytes for each MSDU, a maximum number of bits or bytes for each MSDU, a density for the MPDUs, a duration for the MSDU, a density for the MSDUs, a minimum number of MSDUs in each MPDU, a maximum number of MSDUs in each MPDU, a traffic identifier (TID) and/or access category (AC) priority, an allocation order, a priority per TID and/or AC, a priority between TIDs and/or ACs, a serving limit for TIDs and/or ACs, TID limits, modulation and coding scheme as a function of TID and/or AC, power as a function of TID and/or AC, a number of spatial streams (NSS) and/or antenna chains for each station, contention period (CP), and/or a total transmission duration.

14. The method of claim 13, wherein the one or more of the transmission parameters are one or more of the following:
   a global value;
   a global range;
   a maximum limit on a value or a range;
   a minimum limit on a value or a range;
   a dependency between two or more transmission parameters based on the station selected;
   based on the transmission type;
   a combination with at least one other MPDU/MSDU restriction;
   based on a current transmission parameters;
   a combination including a traffic and/or a Quality of Service (QoS) parameter and/or restriction;
   based on the station operation mode; and/or
   based on a trigger frame and/or resource allocation information element format.

15. The method of claim 14, wherein the packet is received in at least a portion of a beacon frame, an association response, a traffic service response, or a probe response.

16. The method of claim 15, further comprising negotiating with the access point to change at least one of the one or more of the transmission parameters.

17. The method of claim 16, wherein the HE wireless device negotiates with the access point to change at least one of the one or more of the transmission parameters one or more of during association and/or per traffic stream.

18. A wireless device comprising:
   baseband circuitry configured to:
      receive a packet from an access point that comprises one or more transmission parameters for an uplink (UL) multi-user (MU) transmission opportunity (TxOP);
      alter one or more functions of the HE wireless device to transmit data to the access point in accordance with the one or more transmission parameters;
      receive a trigger frame from the access point to indicate the TxOP, wherein the TxOP operates in accordance with the one or more transmission parameters; and
      transmit, in the TxOP, for a specific time period in accordance with: a location of where the one or more transmission parameters were received and the one or more transmission parameters.

19. The wireless device of claim 18, wherein the one or more transmission parameters comprises one or more of: a station identifier, a group identifier, an ACK policy per station, number of TIDs per station to be immediately acknowledged, a timing period, a type of aggregation for media access control (MAC) service data units (MSDUs) or MAC protocol data units (MPDU), a sequence for MPDUs, an A-MPDU duration, a minimum number of bits or bytes for each A-MPDU, a maximum number of bits or bytes for each A-MPDU, a minimum number of bits or bytes for each MPDU, a maximum number of bits or bytes for each MPDU, a density for the A-MPDU, a MPDU duration, a minimum number of bits or bytes for each MSDU, a maximum number of bits or bytes for each MSDU, a density for the MPDUs, a duration for the MSDU, a density for the MSDUs, a minimum number of MSDUs in each MPDU, a maximum number of MSDUs in each MPDU, a traffic identifier (TID) and/or access category (AC) priority, an allocation order, a priority per TID and/or AC, a priority between TIDs and/or ACs, a serving limit for TIDs and/or ACs, TID limits, modulation and coding scheme as a function of TID and/or AC, power as a function of TID and/or AC, a number of spatial streams (NSS) and/or antenna chains for each station, contention period (CP), and/or a total transmission duration.

20. The wireless device of claim 18, wherein the packet is received in at least a portion of a beacon frame, an association response, a traffic service response, or a probe response.

\* \* \* \* \*

UNITED STATES PATENT AND TRADEMARK OFFICE
CERTIFICATE OF CORRECTION

PATENT NO. : 10,056,952 B2  
APPLICATION NO. : 14/978730  
DATED : August 21, 2018  
INVENTOR(S) : Chittabrata Ghosh et al.

It is certified that error appears in the above-identified patent and that said Letters Patent is hereby corrected as shown below:

In the Claims

• At Column 30, Claim 8, Line 56, delete "(TROP)" and insert -- (TxOP) --, therefore Signed and Sealed this  
Fifth Day of February, 2019

Andrei Iancu  
*Director of the United States Patent and Trademark Office*